US010986954B2

United States Patent
Chang

(10) Patent No.: US 10,986,954 B2
(45) Date of Patent: Apr. 27, 2021

(54) AUTOMATIC COOKING APPARATUS

(71) Applicant: Ping-Hua Chang, Taichung (TW)

(72) Inventor: Ping-Hua Chang, Taichung (TW)

(*) Notice: Subject to any disclaimer, the term of this patent is extended or adjusted under 35 U.S.C. 154(b) by 249 days.

(21) Appl. No.: 16/102,974

(22) Filed: Aug. 14, 2018

(65) Prior Publication Data

US 2018/0352997 A1 Dec. 13, 2018

Related U.S. Application Data

(60) Division of application No. 14/677,871, filed on Apr. 2, 2015, now Pat. No. 10,076,207, which is a continuation-in-part of application No. 13/274,361, filed on Oct. 17, 2011, now Pat. No. 10,258,188.

(30) Foreign Application Priority Data

Mar. 25, 2011 (TW) ................................. 100110329
May 26, 2014 (TW) ................................. 103118249

(51) Int. Cl.
*A47J 31/40* (2006.01)
(52) U.S. Cl.
CPC .................................. *A47J 31/401* (2013.01)
(58) Field of Classification Search
CPC ....................................................... A47J 31/401
USPC ........................... 99/279, 282, 283, 285, 330
See application file for complete search history.

(56) References Cited

U.S. PATENT DOCUMENTS

| | | | | |
|---|---|---|---|---|
| 3,146,691 A * | 9/1964 | Martin | ...................... | A23L 3/18 99/330 |
| 3,915,207 A * | 10/1975 | Greenfield, Jr. | ...... | A47J 31/401 141/82 |
| 5,094,153 A * | 3/1992 | Helbling | ................. | A47J 31/52 99/280 |
| 5,387,256 A * | 2/1995 | Enomoto | ................ | A47J 31/42 34/233 |
| 2006/0032381 A1 * | 2/2006 | Shiraishi | ................. | A47J 27/14 99/330 |
| 2008/0028944 A1 * | 2/2008 | Webster | ................ | A47J 31/057 99/283 |
| 2009/0095165 A1 * | 4/2009 | Nosler | .................... | A47J 31/06 99/289 R |

* cited by examiner

*Primary Examiner* — Thien S Tran
(74) *Attorney, Agent, or Firm* — Tsz Lung Yeung

(57) ABSTRACT

An automatic cooking apparatus includes a main housing, a drinking water supply unit, a cooking apparatus and a controller. The drinking water supply unit includes a drinking water tank and a drinking water supplying apparatus including a water delivering unit connected to the drinking water tank. At least one drinking water outlet is provided on the main housing and is connected to the water delivering unit. The cooking apparatus includes a food storage tank and a cooking unit. The cooking unit includes a pot and a heater thermally communicated with the pot. The controller is electrically connected to the drinking water supply unit and the cooking apparatus, and operates the automatic cooking apparatus on at least one of a water supplying mode and a cooking mode.

3 Claims, 27 Drawing Sheets

AUTOMATIC COOKING APPARATUS

CROSS REFERENCES TO RELATED APPLICATIONS

This is a divisional application of a non-provisional application having an application serial number of Ser. No. 14/677,871 and a filing date of Apr. 2, 2015. This non-provisional application is a Continuation-In-Part application of a non-provisional application having an application serial number of Ser. No. 13/274,361 and a filing date of Oct. 17, 2011.

BACKGROUND OF THE PRESENT INVENTION

Field of Invention

The present invention relates to an automatic cooking apparatus, and more particularly to an automatic and grinding and cooking apparatus which is capable of cooking food items and supplying drinking water.

Description of Related Arts

Busy modern people are extremely time-sensitive in their works and lives. Thus, they usually purchase a number of automatic cooking apparatuses, such as a microwave oven, a dishwasher, and a coffee machine etc. The most outstanding feature of these appliances is that a user almost only needs to use one button for operation thereof so as to enjoy the convenience and efficiency brought by these new technologies. However, in the case of electrical rice-cookers or electrical cookers which are utilized for cooking beans, cereals or other agricultural food products, measuring cups are needed for manually measuring the correct amounts of food and water. This causes inconvenience to many people, especially office workers or housewives who then would rather cook instant noodles or eat in restaurants. This unsatisfactory situation causes substantial difficultly in promoting automatic or smart kitchens.

The inconvenience of the conventional automatic cooking apparatus as mentioned above is caused by the absence of an automatic water supply apparatus, especially a hot water supply equipment for saving cooking time and energy. As a result, a user needs to manually acquire a right amount of cold water or hot water from a water tanker.

Hence, there is a need to have an automatic cooking apparatus which is capable of cooking food items and supplying a correct amount of drinking water in accordance of predetermined cooking schedules.

SUMMARY OF THE PRESENT INVENTION

An objective of the present invention is to provide an automatic cooking apparatus which is capable of supplying drinking water and cooking food items through a predetermined program.

Another objective of the present invention is to provide an automatic cooking apparatus which comprises a drinking water supply unit and a cooking apparatus, wherein the drinking water supply unit is arranged to deliver drinking water for user's consumption and for cooking food items in the cooking apparatus.

Another objective of the present invention is to provide an automatic cooking apparatus which is capable of supplying drinking water and cooking food items without involving rinsing thereof.

Another objective of the present invention is to provide an automatic cooking apparatus, wherein the cooking apparatus comprises a grinding arrangement which is capable of effectively grinding food items before cooking.

Another objective of the present invention is to provide an automatic cooking apparatus, wherein the cooking apparatus comprises a filter arrangement which is capable of effectively mixing drinking water and grinded food items before cooking.

Another objective of the present invention is to provide an automatic cooking apparatus which does not require acquiring water from an external water pipe. In other words, the automatic cooking apparatus is a self-contained unit for supplying drinking water and for automatic cooking.

Another objective of the present invention is to provide a fully automatic cooking apparatus which can operate sophisticated cooking processes by a one button or remote controller operated for reaching a really convenient cooking purpose with saving energy and time consumption.

In one aspect of the present invention, it provides an automatic cooking apparatus, comprising:

a main housing having a receiving cavity;

a drinking water supply unit, which comprises:

a drinking water tank supported in the receiving cavity, the drinking water tank having a drinking water cavity for storing a predetermined amount of water, a first water dispensing outlet, the water in the drinking water cavity being arranged to be selectively dispensed out of the drinking water cavity through the first water dispensing outlet and the second water dispensing outlet; and a drinking water supplying apparatus supported in the receiving cavity, the drinking water supplying apparatus comprising a water delivering unit connected to the first water dispensing outlet of the drinking water tank, and at least one drinking water outlet which is provided on the main housing and is connected to the water delivering unit; and a cooking apparatus, which comprises:

a food storage tank supported in the receiving cavity, the food storage tank having a food storage cavity for storing a predetermined amount of food items, and a food dispensing outlet, the food items being arranged to be dispensed out of the food storage cavity through the food dispensing outlet; and a cooking unit, which comprises:

a pot provided in the receiving cavity at a position correspond to the food dispensing outlet and the first water dispensing outlet, in such a manner that the water and the food contained in the drinking water tank and the food storage tank are capable of being dispensed to the pot through the food dispensing outlet and the first water dispensing outlet; and a heater which is provided in the receiving cavity, and is thermally communicated with the pot; and a controller electrically which is connected to the drinking water supply unit and the cooking apparatus, and operates the automatic cooking apparatus on at least one of a water supplying mode and a cooking mode, wherein in the water supplying mode, the drinking water supply unit is arranged to dispense water from the drinking water tank through the drinking water outlet, wherein in the cooking mode, the water and the food items in the drinking water tank and the food storage tank are controllably dispensed to the pot through the first water dispensing outlet and the food dispensing outlet respectively, the pot being arranged to be heated up by the heater for cooking the food items and the water in the pot.

In another aspect of the present invention, it provides an automatic cooking apparatus, comprising:

a main housing having a receiving cavity;

a drinking water supply unit which comprises a drinking water tank supported in the receiving cavity, the drinking water tank having a drinking water cavity for storing a predetermined amount of water, and first water dispensing outlet, the water in the drinking water cavity being arranged to be selectively dispensed out of the drinking water cavity through the first water dispensing outlet;

a cooking apparatus, which comprises:

a food storage tank supported in the receiving cavity, the food storage tank comprising a food valve and having a food storage cavity for storing a predetermined amount of food items, and a food dispensing outlet, the food items being arranged to be dispensed out of the food storage cavity through the food dispensing outlet;

a grinding arrangement supported in the main housing and is connected to the second food output member in such a manner that the food items passing through the food valve is selectively guided to enter one of the grinding arrangement and the first food output member; and a cooking unit, which comprises:

a pot provided in the receiving cavity at a position correspond to the food dispensing outlet and the first water dispensing outlet, in such a manner that the water and the food contained in the drinking water tank and the food storage tank are capable of being dispensed to the pot through the food dispensing outlet and the first water dispensing outlet; and a heater which is provided in the receiving cavity, and is thermally communicated with the pot; and a controller electrically which is connected to the drinking water supply unit and the cooking apparatus, and operates the automatic cooking apparatus on at least a cooking mode in which the water and the food items in the drinking water tank and the food storage tank are controllably dispensed to the pot through the first water dispensing outlet and the food dispensing outlet respectively, the pot being arranged to be heated up by the heater for cooking the food items and the water in the pot.

DETAILED DESCRIPTION OF THE PREFERRED EMBODIMENT

The following detailed description of the preferred embodiment is the preferred mode of carrying out the invention. The description is not to be taken in any limiting sense. It is presented for the purpose of illustrating the general principles of the present invention.

Figure 1:
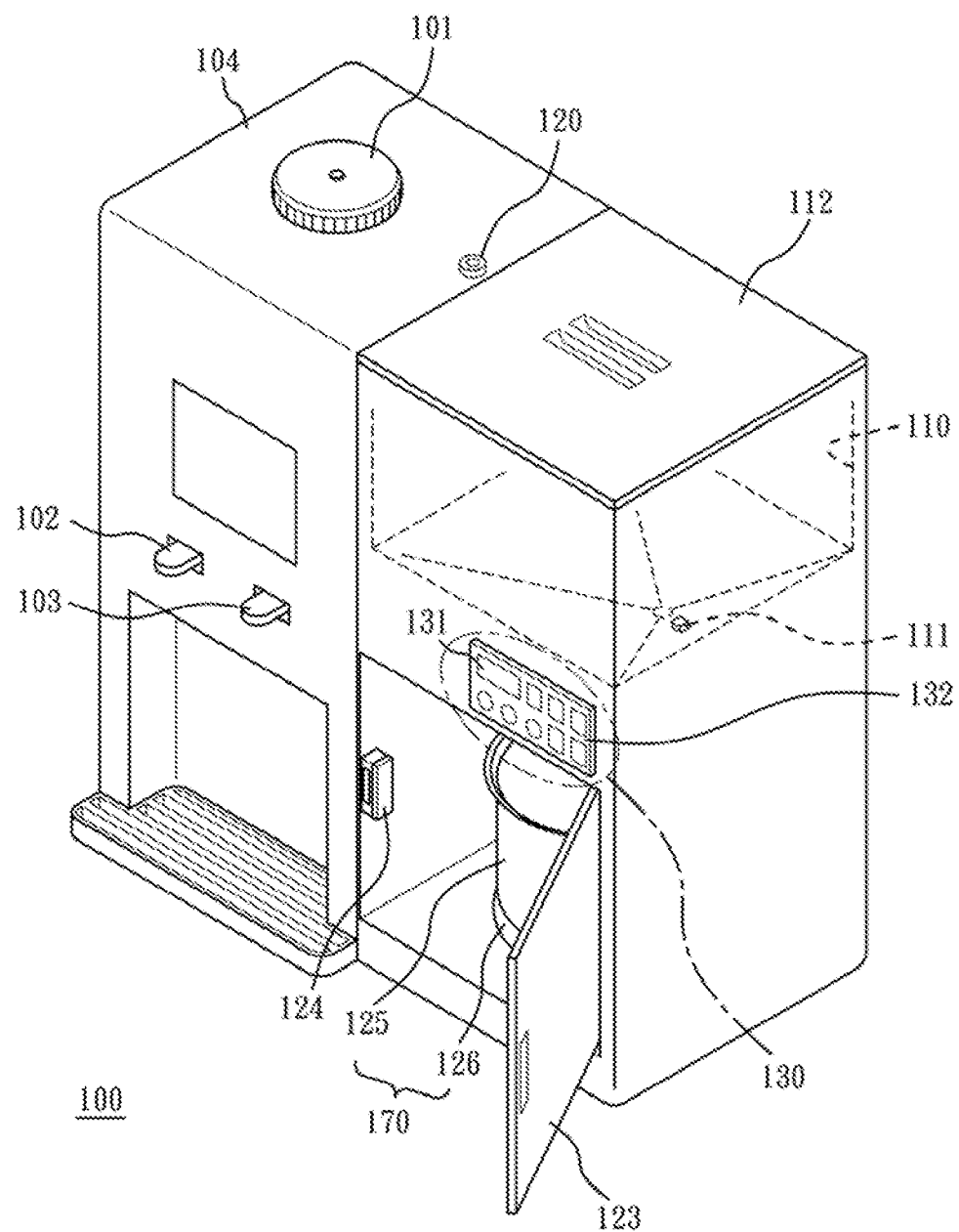
FIG. 1 is a schematic three-dimensional view showing an appearance of an automatic cooking apparatus capable of supplying drinking water according to one embodiment of the present invention.
Figure 2:
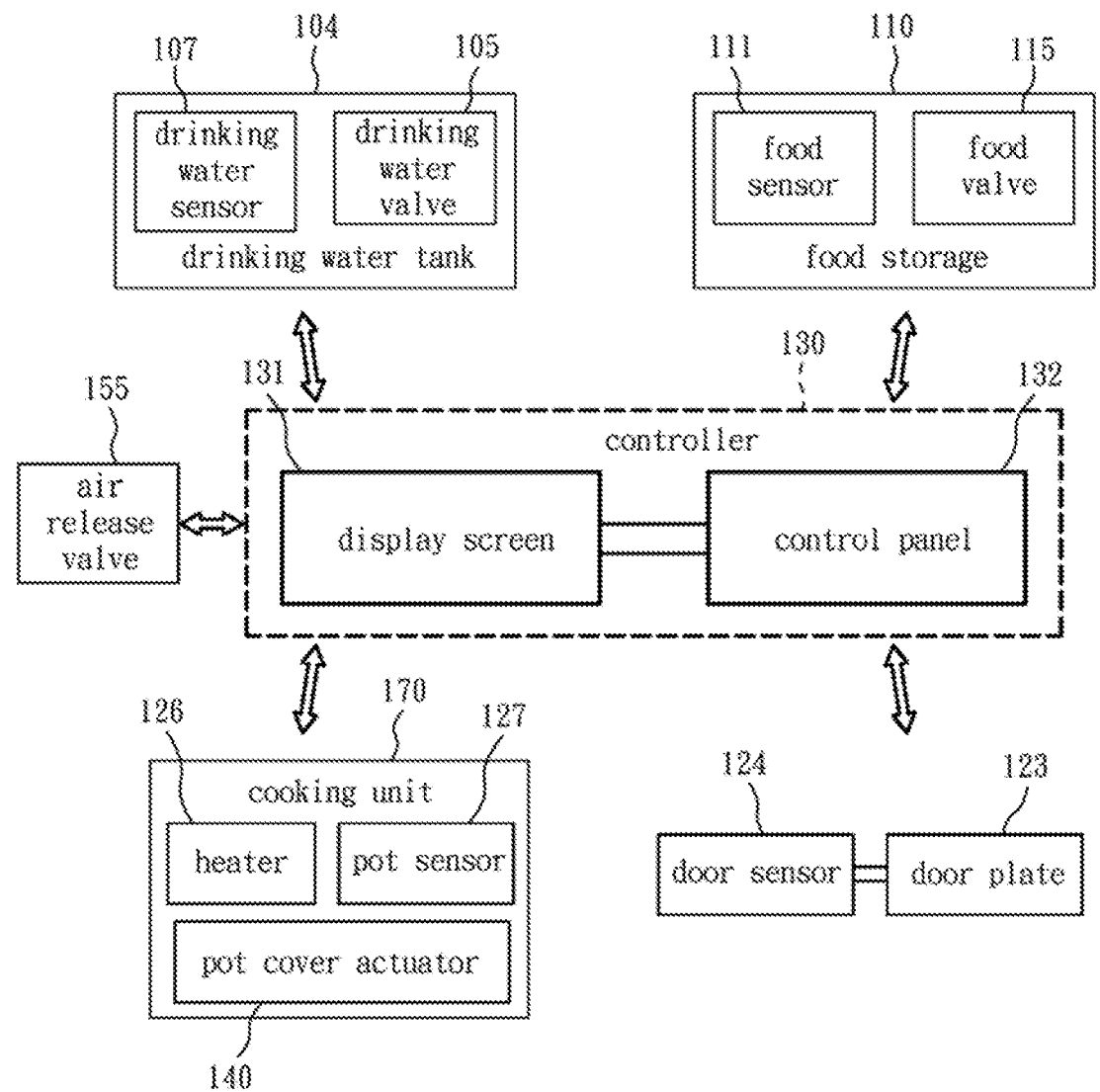
FIG. 2 is a schematic function block diagram of an automatic cooking apparatus capable of supplying drinking water shown in FIG. 1.

FIG. 1 is a schematic three-dimensional view of an appearance of an automatic cooking apparatus capable of supplying drinking water. FIG. 2 is a schematic function block diagram of an automatic cooking apparatus capable of supplying drinking water shown in FIG. 1. For illustrating the technical features of the present invention more specifically, four embodiments are provided. The first embodiment (as shown in FIG. 3, FIG. 4A, FIG. 4B and FIG. 4C) includes the least required components. The second embodiment (as shown in FIG. 5A and FIG. 5B) on top of the first embodiment further includes a confined space constructed by a partition and a pot for cooking, wherein an operation process of the second embodiment is the same as that of the first embodiment. The third embodiment (as shown in FIG.

Figure 7A:
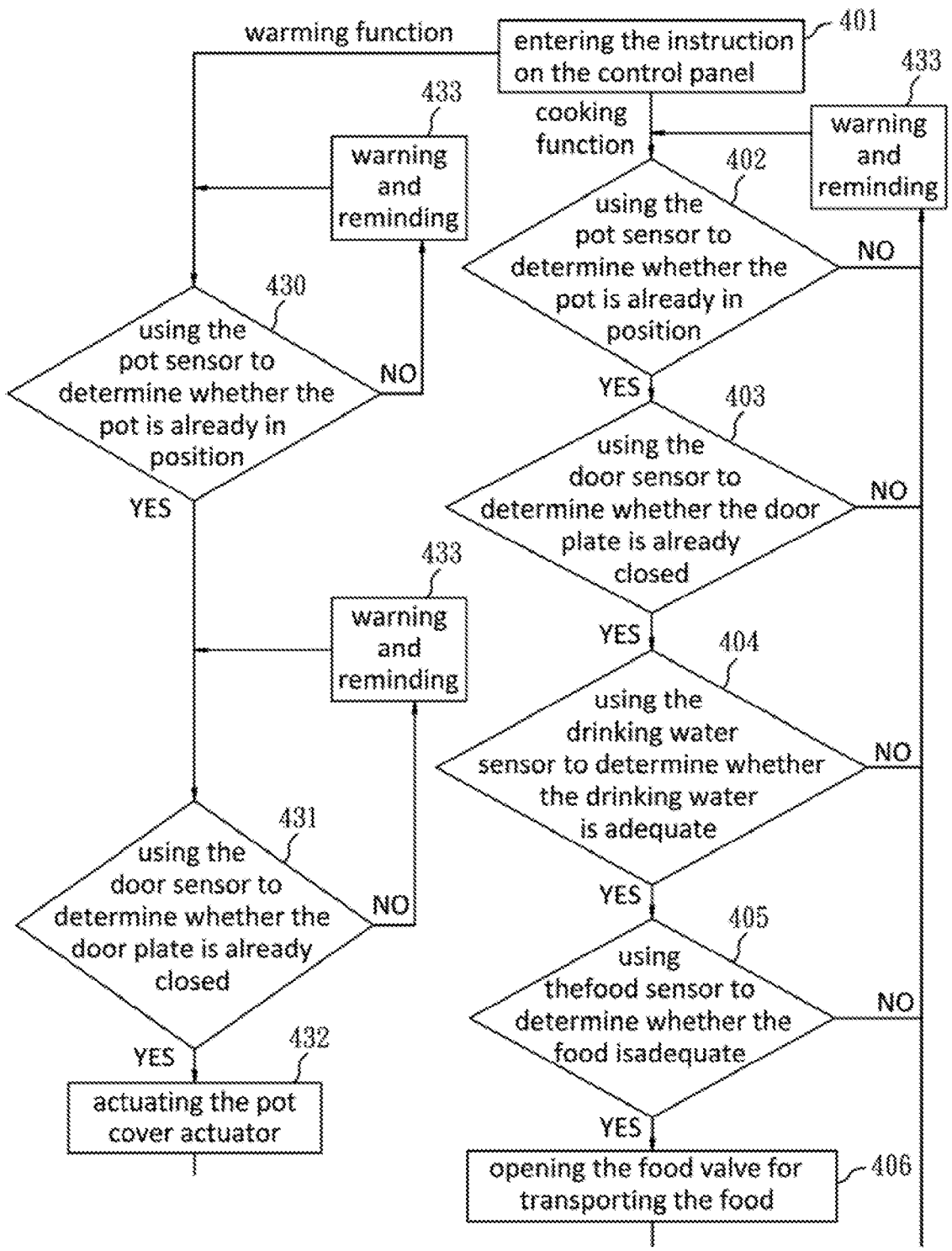
FIG. 7A, FIG. 7B and FIG. 7C illustrate a flow chart showing the operation of the automatic cooking apparatus capable of supplying drinking water according to the third embodiment of the present invention.
Figure 7B:
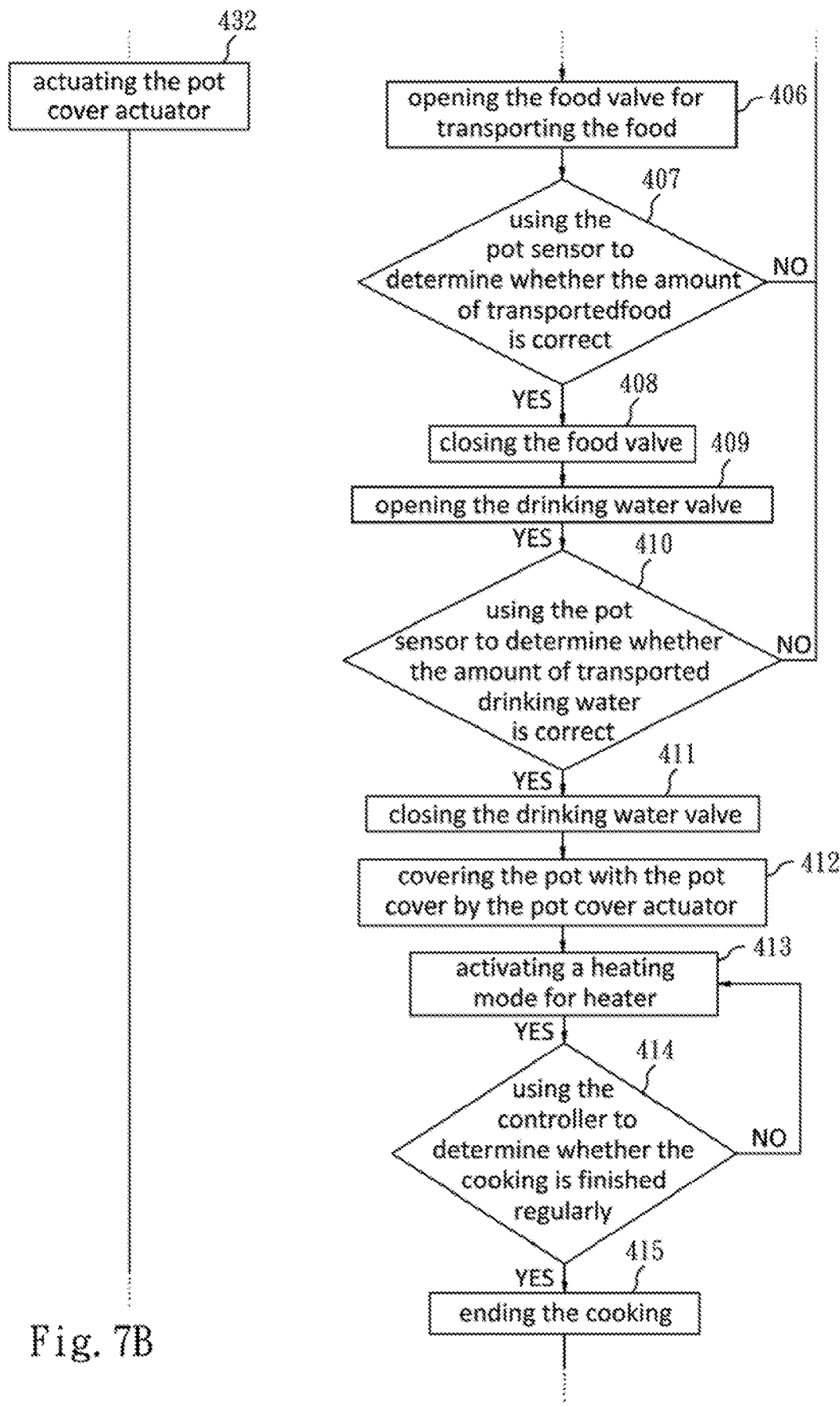
Figure 7C:
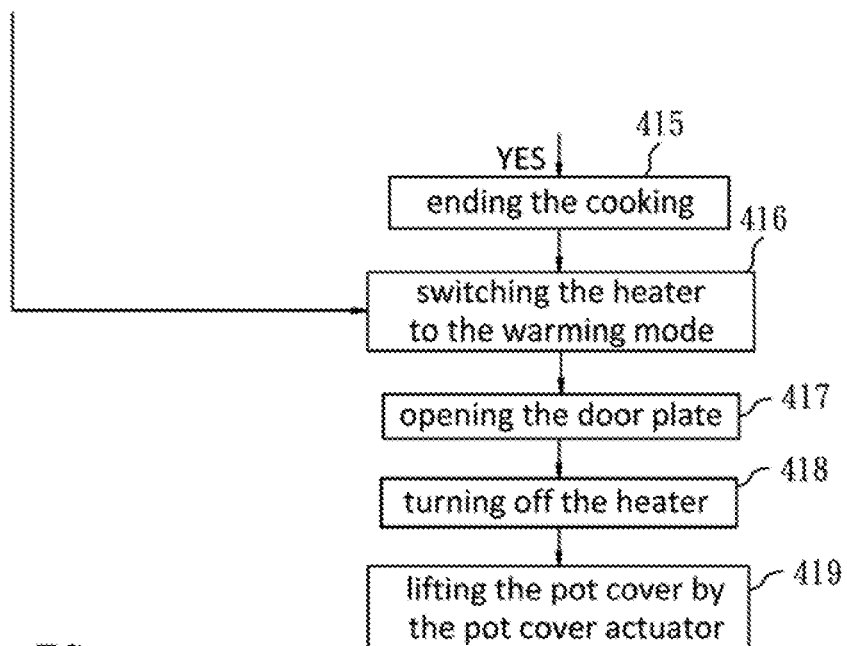

6, FIG. 7A, FIG. 7B and FIG. 7C) and the fourth embodiment (as shown in FIG. 8, FIG. 9A, FIG. 9B, and FIG. 9C) use the confined space constructed by a pot cover and the pot for cooking, wherein a difference between the third embodiment and the fourth embodiment is an actuating pattern of a pot cover actuator, which impacts a process order of the third embodiment and the fourth embodiment.

As shown in FIG. 1 can be known form the appearance the present invention, the automatic cooking apparatus capable of supplying drinking water 100 includes a drinking water tank 104, a drinking water tank cover 101, a drinking water outlet 102 and 103, a food storage 110, a food storage cover 112, a cooking unit 170, a controller 130, a door plate 123 and a door sensor 124. As the door plate 123 is opened state, there is an accommodation space in which a heater 126 and a pot 125 can be disposed.

As shown in FIG. 1, an upper left half part of the automatic cooking apparatus capable of supplying drinking water 100 can be designed for providing drinking water, and an right half part can be designed for cooking food, and an upper half part can be designed for storing water or food. However, such a design can be made flexibly according to different needs, such as adding sets of food storages, etc.

As shown in FIG. 2, it can be known that, in the automatic cooking apparatus capable of supplying drinking water 100, the controller 130 includes a display screen 131 and a control panel 132 on which a user can enter an instruction, wherein the control panel 132 is implemented by an electronic circuit. The controller 130 are electrically connected the several components for receiving or transmitting signals, wherein the components can be such as a drinking water sensor 107 and a drinking water valve 105 disposed in the drinking water tank 104, a food sensor 111 and a food valve 115 disposed in the food storage 110, an air release valve 155, the heater 126, the pot sensor 127, and the pot cover actuator 140 disposed in the cooking unit 170, the door sensor 124 and the door plate 123.

For example, after receives a food type or quantity sensed by the food sensor 111, the controller 130 may receive an instruction entered via the control panel 132 and then transmit a control signal to the food valve 115.

Figure 3:
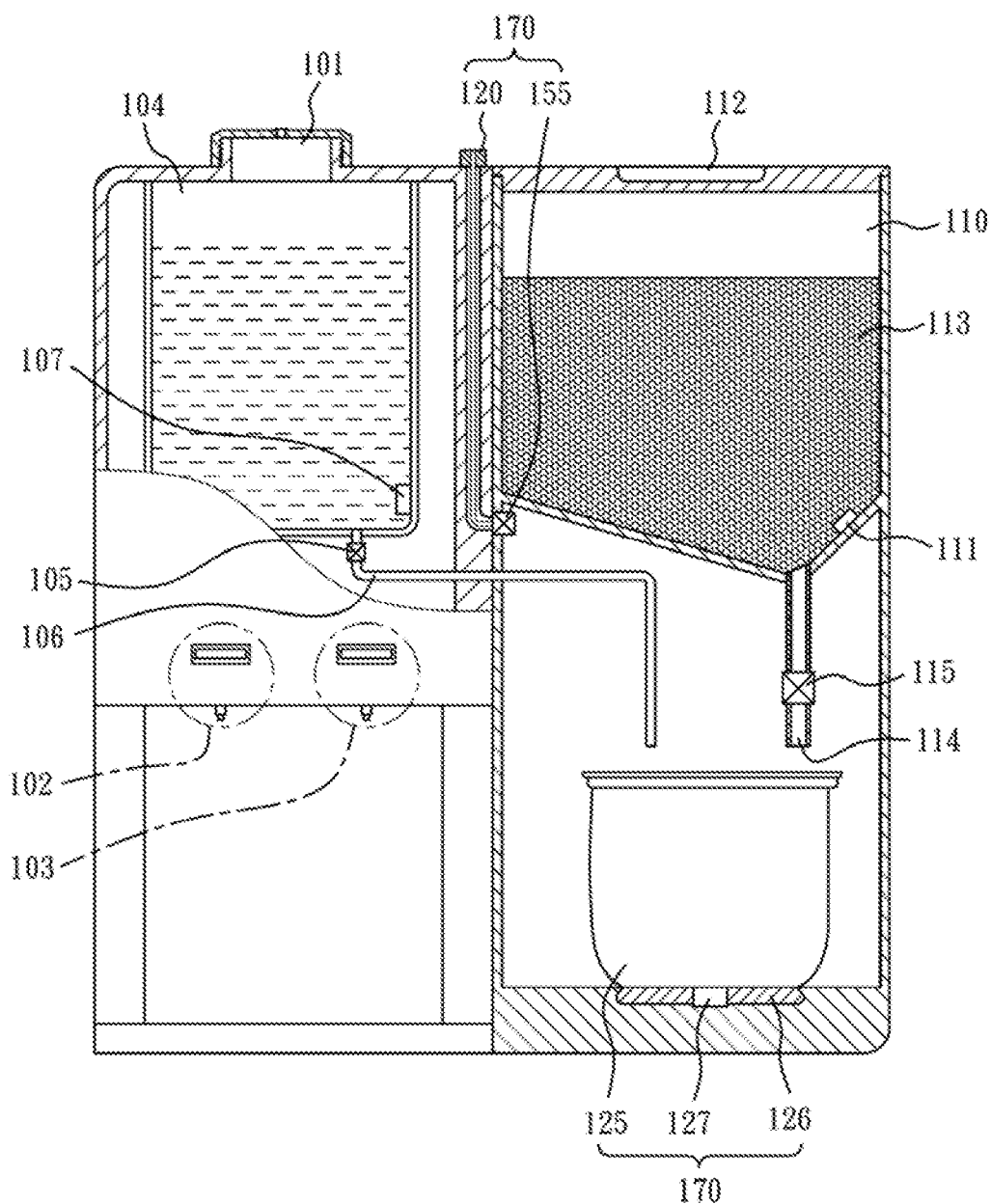
FIG. 3 is a schematic cross-sectional view of an automatic cooking apparatus capable of supplying drinking water according to the first embodiment of the present invention.
Figure 4A:
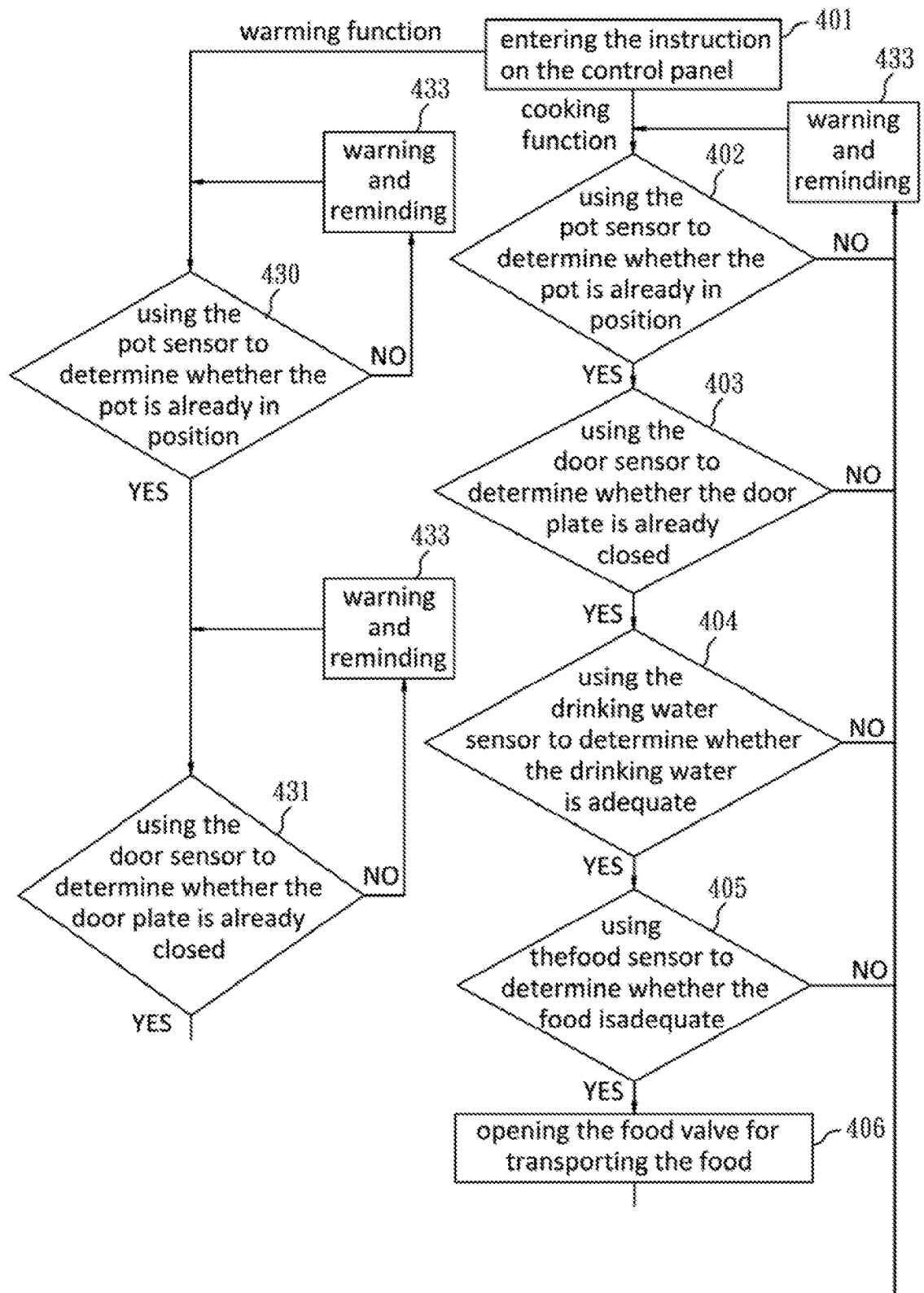
FIG. 4A, FIG. 4B and FIG. 4C illustrate a flow chart showing the operation of the automatic cooking apparatus capable of supplying drinking water according to the first embodiment of the present invention.
Figure 4B:
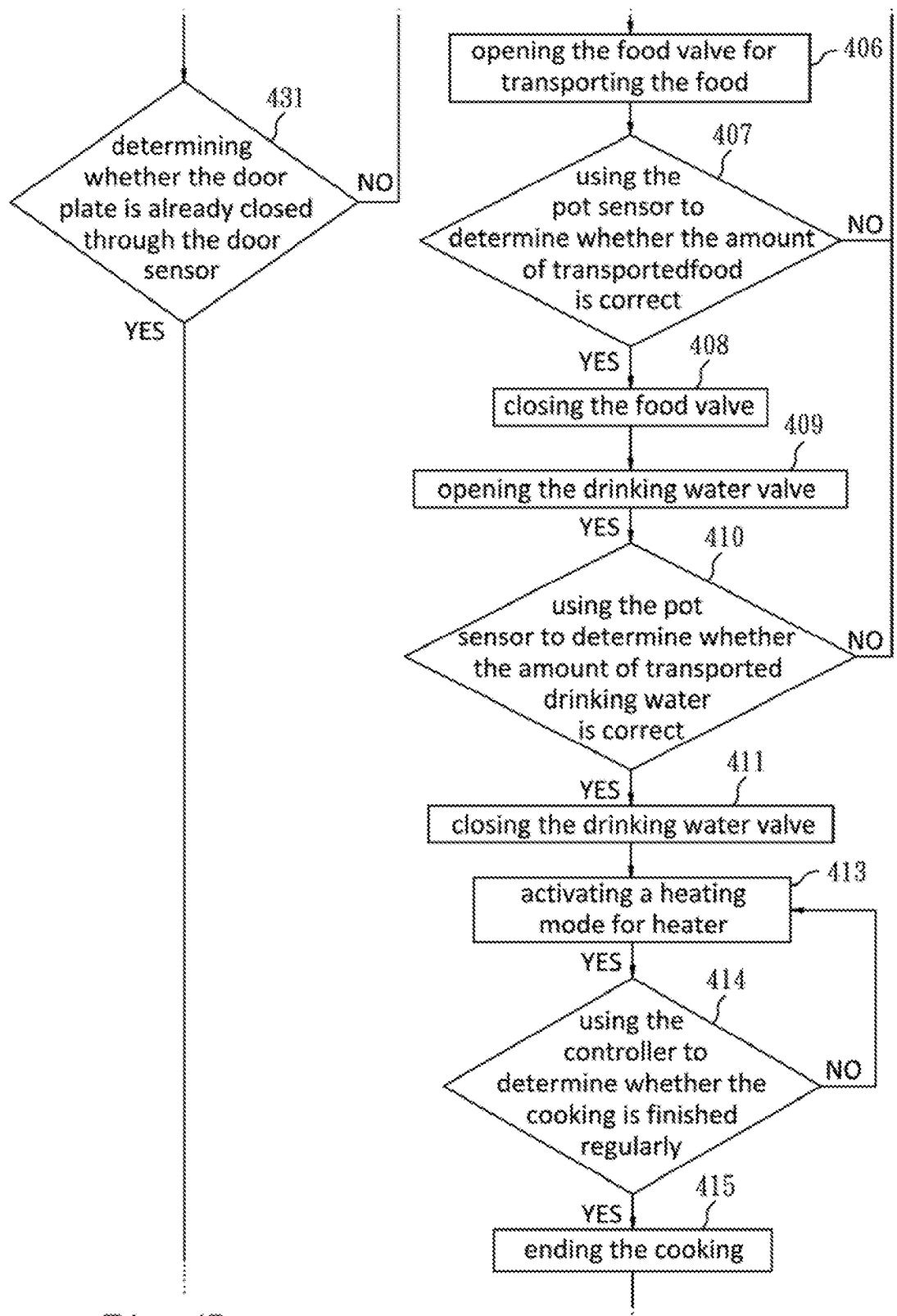
Figure 4C:
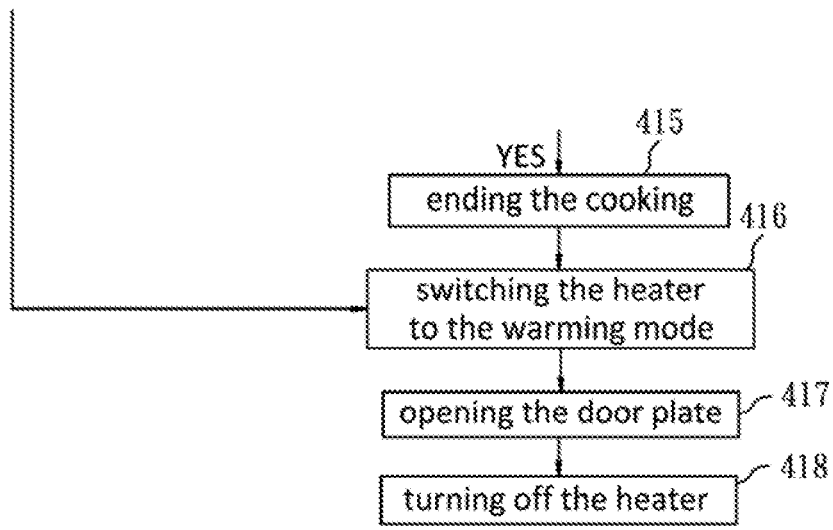
Figure 5A:
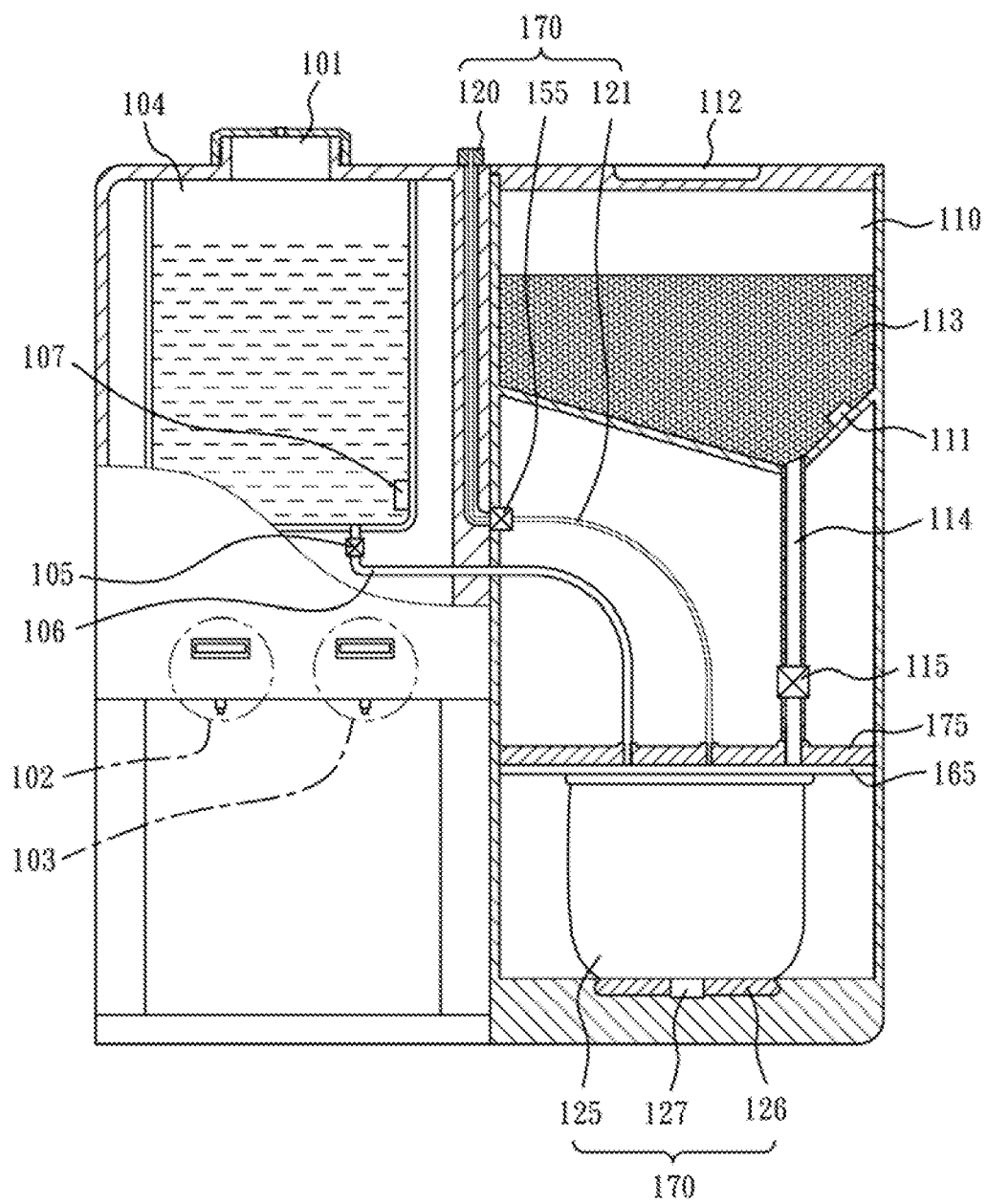
FIG. 5A is a schematic cross-sectional view of an automatic cooking apparatus capable of supplying drinking water according to the second embodiment of the present invention.
Figure 5B:
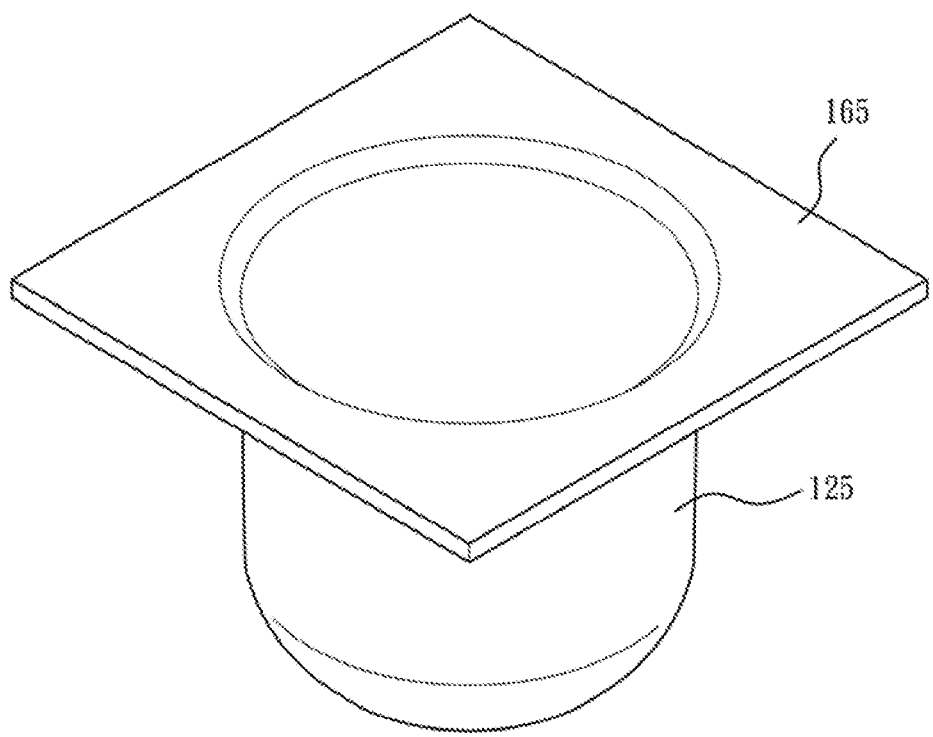
FIG. 5B is a schematic three-dimensional view of a pot according to the second embodiment of the present invention.

Continued from the above, the first embodiment of the present invention can be known by referring to FIG. 3, FIG. 4A, FIG. 4B and FIG. 4C. FIG. 3 is a schematic cross-sectional view of the automatic cooking apparatus capable of supplying drinking water according to the first embodiment of the present invention. FIG. 4A, FIG. 4B and FIG. 4C illustrate a flow chart showing the operation of the automatic cooking apparatus capable of supplying drinking water according to the first embodiment of the present invention.

In the first embodiment, the automatic cooking apparatus capable of supplying drinking water includes the drinking water tank 104, the drinking water tank cover 101, the drinking water sensor 107, a drinking water output tube 106 and the drinking water valve 105. The drinking water sensor 107 is disposed on a bottom-side surface of the drinking water tank 104, and the drinking water output tube 106 is disposed under the drinking water tank 104, and the drinking water valve 105 is disposed on the drinking water tube 106 to control the open or close of the drinking water tube 106, thereby appropriately adjusting the amount of drinking water. The drinking water supply unit includes at least one outlet such as a cold water outlet 102 and a hot water outlet 103, which is a well-known technology and thus is not described again. The drinking water tank cover 101 is disposed over the drinking water tank 104.

In addition, the food storage 110 includes the food sensor 111, the food storage cover 112, a food output member 114 and the food valve 115. The food sensor 111 is disposed on a bottom surface of the food storage 110, and the food output member 114 is disposed under the food storage 110, and the food valve 115 is disposed on the food output member 114 to control the food output member 114. The shape of the food output member 114 can be a tubular shape or a grooved shape. The bottom surface of the food storage 110 can be a slant surface for allowing food to flow conveniently. The food storage cover 112 is disposed over the food storage 110.

The cooking unit 170 includes the heater 126, a steam output port 120, the air release valve 155 and the pot 125. The heater 126 is used for heating the pot 125 placed thereon, and an opening of the pot 125 is corresponding to the drinking water output tube 106 and the food output member 114 for receiving the drinking water and the food. A steam output member includes the air release valve 155 and the external steam output port 120, which is used for releasing water steam generated in the pot to the outside during cooking process. The air release valve 155 is controlled by the controller 130 to construct a confined space during cooking for conveniently braising food.

Furthermore, please refer to FIG. 4A, FIG. 4B and FIG. 4C for understanding the operation process of the first embodiment.

Before cooking, preparation steps for the user is to place a washed empty or contained food pot 125 on the heater 126 after opening the door plate 123, if in a new cooking mode, it will fill the drinking water tank 104 and the food storage 110 with water and food.

Then, the user enters an instruction on the control panel 132 (step 401) to select a cooking function or a warming function.

If the warming function is selected, step 430 is performed for using the pot sensor 127 to determine whether the pot 125 is already in position. When the result of step 430 is yes, step 431 is performed for using the door sensor 124 to determine whether the door plate 123 is already closed. When the result of step 431 is yes, step 416 is performed for switching the heater 126 to a warming mode, and then the door plate 123 is opened (step 417), the heating process is ended and the heater 126 is turned off for safety reasons (step 418).

If the cooking function is selected (step 401), step 402 is performed for using the pot sensor 127 to determine whether the pot 125 is already in position. When the result of step 402 is yes, step 403 is performed for using the door sensor 124 to determine whether the door plate 123 is already closed. When the result of step 403 is yes, step 404 is performed for using the drinking water sensor 107 to determine whether the drinking water is adequate. When the result of step 404 is yes, step 405 is performed for using the food sensor 111 to determine whether the food is adequate. When the result of step 405 is yes, the food valve 115 is opened for transporting the food (step 406), and then step 407 is performed for using the pot sensor 127 to determine whether the amount of transported food is correct. When the result of step 407 is yes, the food valve 115 is closed (step 408), and the drinking water valve 105 is opened for transporting the drinking water (step 409). Thereafter, step 410 is performed for using the pot sensor 127 to determine whether the amount of transported drinking water is correct. When the result of step 410 is yes, the drinking water valve 105 is closed (step 411), and a heating mode is activated for the heater 126 (step 413). Then, step 414 is performed for using the controller 130 to determine whether the cooking is finished regularly. When the result of step 414 is yes, the cooking is ended (step 415), and the heater 126 is switched to the warming mode (step 416), and the door plate 123 is opened (step 417), and the heater 126 is turned off for safety reasons (step 418).

In the entire operation process, as long as abnormality occurs, warning and reminding will be issued to the user (step 433), and then the initial state is returned for restarting the aforementioned steps and processes, thus ensuring that every spare item has been well prepared before entering the heating mode or the warming mode, and also for safety reasons. In addition, as shown in FIG. 4A, FIG. 4B and FIG. 4C, although the food and the drinking water are sensed after the door plate is closed, yet step 403 also can be performed later in accordance with the user's habits. Further, during cooking process, the open or close of the air release valve 155 also can be controlled for releasing the redundant water steam.

Please refer to FIG. 5A, FIG. 5B, FIG. 4A, FIG. 4B and FIG. 4C for understanding the second embodiment of the present invention. FIG. 5A is a schematic cross-sectional view of an automatic cooking apparatus capable of supplying drinking water according to the second embodiment of the present invention. FIG. 5B is a schematic three-dimensional view of a pot according to the second embodiment of the present invention. As the second embodiment has the same operation process with the first embodiment, the operation process of second embodiment can be comprehended by referring to FIG. 4A, FIG. 4B and FIG. 4C. In the second embodiment, the automatic cooking apparatus capable of supplying drinking water includes the drinking water tank 104, the drinking water tank cover 101, the drinking water sensor 107, the drinking water output tube 106 and the drinking water valve 105. The drinking water sensor 107 is disposed on a bottom-side surface of the drinking water tank 104, and the drinking water output tube 106 is disposed under the drinking water tank 104, and the drinking water valve 105 is disposed on the drinking water tube 106 to control the open or close of the drinking water tube 106, thereby appropriately adjusting the amount of drinking water. The drinking water supply unit includes a cold water outlet 102 and a hot water outlet 103. The drinking water tank cover 101 is disposed over the drinking water tank 104.

In addition, the food storage 110 includes the food sensor 111, the food storage cover 112, the food output member 114 and the food valve 115. The food sensor 111 is disposed on a bottom surface of the food storage, and the food output member 114 is disposed under the food storage 110, and the food valve 115 is disposed on the food output member 114 to control the food output member 114. The shape of the food output member 114 can be a tubular shape or a grooved shape. The bottom surface of the food storage 110 can be a slant surface for allowing food to flow conveniently. The food storage cover 112 is disposed over the food storage 110.

The cooking unit 170 includes the heater 126, the steam output port 120, a steam output tube 121, the air release valve 155 and the pot 125. As shown in FIG. 5B, the pot 125 has a square flange 165 of which the size can be engaged with wall surfaces, and thus the pot 125 can be fixed in a position by the engagement of the flange 165 and the wall surfaces while the pot 125 is being placed. The openings of the food output member 114, the steam output tube 121 and the drinking water output tube 106 are aligned with the opening of the pot 125 through the partition 175. The heater 126 is used for heating the pot 125 placed thereon. The steam output member includes the air release valve 155, the external steam output port 120 and the steam output tube 121, which is used for releasing water steam generated in the pot to the outside during cooking process. The air release valve 155 is controlled by the controller 130, to construct a confined space during cooking for conveniently braising food. Accordingly, the partition can form a confined space with a flange of the pot to achieve a similar braising result of the pot cover.

Referring to FIG. 4A, FIG. 4B and FIG. 4C, in the entire operation process, as long as abnormality occurs, warning and reminding will be issued to the user (step 433), and then the initial state is returned for restarting the aforementioned steps and processes, thus ensuring that every spare item has been well prepared before entering the heating mode or the warming mode, and also for safety reasons. In addition, as shown in FIG. 4A, FIG. 4B and FIG. 4C, although the food and the drinking water are sensed after the door plate is closed, yet step 403 also can be performed later in accordance with the user's habits. Further, during cooking process, the open or close of the air release valve 155 also can be controlled for releasing the redundant water steam.

Figure 6:
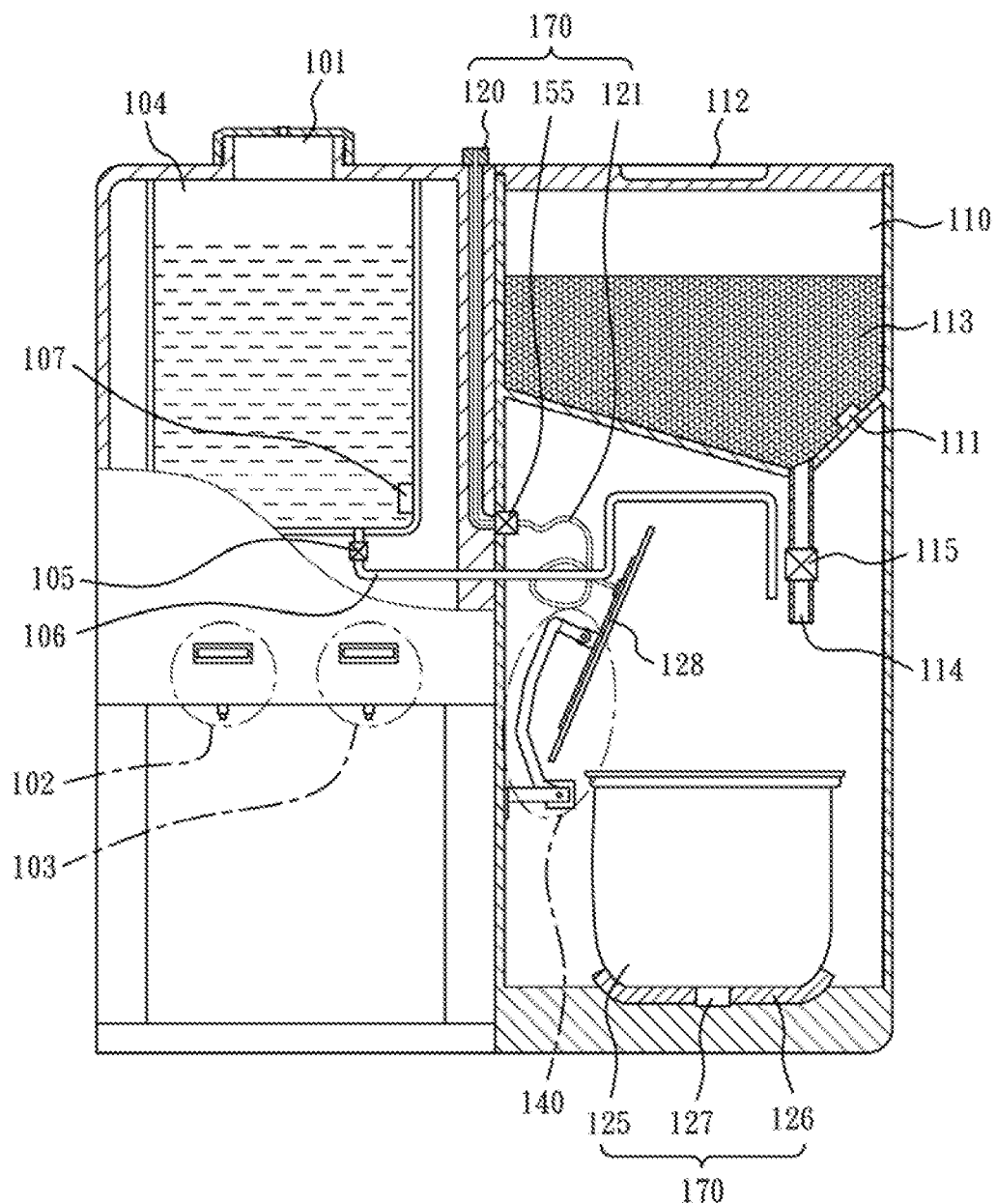
FIG. 6 is a schematic cross-sectional view of an automatic cooking apparatus capable of supplying drinking water according to the third embodiment of the present invention.

The third embodiment of the present invention can be comprehended by referring to FIG. 6, FIG. 7A, FIG. 7B and FIG. 7C. FIG. 6 is a schematic cross-sectional view of an automatic cooking apparatus capable of supplying drinking water according to the third embodiment of the present invention. FIG. 7A, FIG. 7B and FIG. 7C illustrate a flow chart showing the operation of the automatic cooking apparatus capable of supplying drinking water according to the third embodiment of the present invention.

In the third embodiment, the automatic cooking apparatus capable of supplying drinking water includes the drinking water tank 104, the drinking water tank cover 101, the drinking water supply unit 102 and 103, the food storage 110, the food storage cover 112, the cooking unit 170 and the controller 130.

The drinking water tank 104 includes the drinking water sensor 107, the drinking water output tube 106 and the drinking water valve 105, wherein the drinking water sensor 107 is disposed on a bottom-side surface of the drinking water tank 104, and the drinking water output tube 106 is disposed under the drinking water tank 104, and the drinking water valve 105 is disposed on the drinking water tube 106 to control the open or close of the drinking water tube 106 thereby appropriately adjusting the amount of drinking water. The drinking water supply unit includes at least one outlet, such as a cold water outlet 102 or a hot water outlet 103. The drinking water tank cover 101 is disposed over the drinking water tank 104.

The food storage 110 includes the food sensor 111, a food output member 114 and the food valve 115. The food sensor 111 is disposed on a bottom surface of the food storage 110, and the food output member 114 is disposed under the food storage 110, and the food valve 115 is disposed on the food output member 114 to control the food output member 114. The shape of the food output member 114 can be a tubular shape or a grooved shape. The bottom surface of the food storage 110 can be a slant surface for allowing food to flow conveniently. The food storage cover 112 is disposed over the food storage 110.

The cooking unit 170 includes the heater 126, the steam output port 120, the steam output tube 121, the air release valve 155 and the pot 125. The heater 126 is used for heating the pot 125 placed thereon, and an opening of the pot 125 is corresponding to the drinking water output tube 106 and the food output member 114 for receiving the drinking water and the food. A steam output member includes the steam output tube 121 and the external steam output port 120, which is used for releasing water steam generated in the pot 125 to the outside during cooking process. The steam output port 120 can make a confined space with a latch in the pot 125 in accordance with needs for braising food, or control the flow of the steam output tube 121 by directly using the air release valve 155. The pot cover actuator 140 is used for actuating the pot cover 128 to cover and close the pot 125, wherein the pot cover 128 corresponding to an opening of the pot 125 has a first hole connected with the steam output tube 121.

The controller 130 is electrically connected to the drinking water sensor 107, the food sensor 111, the drinking valve 105, the food valve 115, the pot sensor 127, the pot cover actuator 140 and the heater 126, wherein the controller 130 receives a sense result from the drinking water sensor 107, the pot sensor 127, and the food sensor 111, and transmits a control signal to the drinking water valve 105, the food valve 115, the pot cover actuator 140 and the heater 126 in accordance with the instruction of the user.

In the third embodiment of the automatic cooking apparatus capable of supplying drinking water, the pot cover actuator 140 is a single-arm transmission mechanism, and a movement of the pot cover 128 is an arc swing path.

In the third embodiment, the automatic cooking apparatus capable of supplying drinking water further includes the pot sensor 127 disposed on the heater 126 and under the pot 125 to sense a weight of the pot (empty pot state, with drinking water state and/or with food state), and is electrically connected to the controller 130 so as to return the weight of the pot to the controller 130. As shown in FIG. 3, the shape of heater 126 is a ring, and the pot sensor 127 can be disposed on the center of the heater.

In the third embodiment, the automatic cooking apparatus capable of supplying drinking water further includes the door plate 123 and the door sensor 124. The door sensor 124 senses a door plate 123 state (the open or close) and is electrically connected to the controller 130 so as to return the door plate state to the controller 130. The heater 126 includes the heating mode and the warming mode. The drinking water output tube 106 can be connected to the hot water outlet 103 to conduct hot water into the pot 125 of the cooking unit, thereby speeding the cooking time.

More specifically, the operation process of third embodiment can be comprehended by referring to FIG. 7A, FIG. 7B and FIG. 7C.

Before cooking, preparation steps for the user is to place a washed empty or contained food pot 125 on the heater 126 after opening the door plate 123, if in a new cooking mode, it will fill the drinking water tank 104 and the food storage 110 with water and food.

Then, the user enters an instruction on the control panel 132 (step 401) to select a cooking function or a warming function.

If the warming function is selected, step 430 is performed for using the pot sensor 127 to determine whether the pot 125 is already in position. When the result of step 430 is yes, step 431 is performed for using the door sensor 124 to determine whether the door plate 123 is already closed. When the result of step 431 is yes, step 432 is performed for actuating the pot cover actuator, and the heater 126 is switched to the warming mode (step 416), and then the door plate 123 is opened (step 417), and the heater 126 is turned off for safety reasons (step 418), and the pot cover 128 is lifted by the pot cover actuator (step 419).

If the cooking function is selected (step 401), step 402 is performed for using the pot sensor 127 to determine whether the pot 125 is already in position. When the result of step 402 is yes, step 403 is performed for using the door sensor 124 to determine whether the door plate 123 is already closed. When the result of step 403 is yes, step 404 is performed for using the drinking water sensor 107 to determine whether the drinking water is adequate. When the result of step 404 is yes, step 405 is performed for using the food sensor 111 to determine whether the food is adequate. When the result of step 405 is yes, the food valve 115 is opened for transporting the food (step 406), and then step 407 is performed for using the pot sensor 127 to determine whether the amount of transported food is correct. When the result of step 407 is yes, the food valve 115 is closed (step 408), and the drinking water valve 105 is opened for transporting the drinking water (step 409). Thereafter, step 410 is performed for using the pot sensor 127 to determine whether the amount of transported drinking water is correct. When the result of step 410 is yes, the drinking water valve 105 is closed (step 411), and the pot cover 128 is covered pot 125 by the pot cover actuator (step 412), and a heating mode is activated for the heater 126 (step 413). Then, step 414 is performed for using the controller 130 to determine whether the cooking is finished regularly. When the result of step 414 is yes, the cooking is ended (step 415), and the heater 126 is switched to the warming mode (step 416), and the door plate 123 is opened (step 417), and the heater 126 is turned off for safety reason (step 418), and the pot cover 128 is lifted by the pot cover actuator (step 419).

In the entire operation process, as long as abnormality occurs, warning and reminding will be issued to the user (step 433), and then the initial state is returned for restarting the aforementioned steps and processes, thus ensuring that every spare item has been well prepared before entering the heating mode or the warming mode, and also for safety reasons. In addition, as shown in FIG. 7A, FIG. 7B and FIG. 7C, although the food and the drinking water are sensed after the door plate is closed, yet step 403 also can be performed later in accordance with the user's habits.

Figure 8:
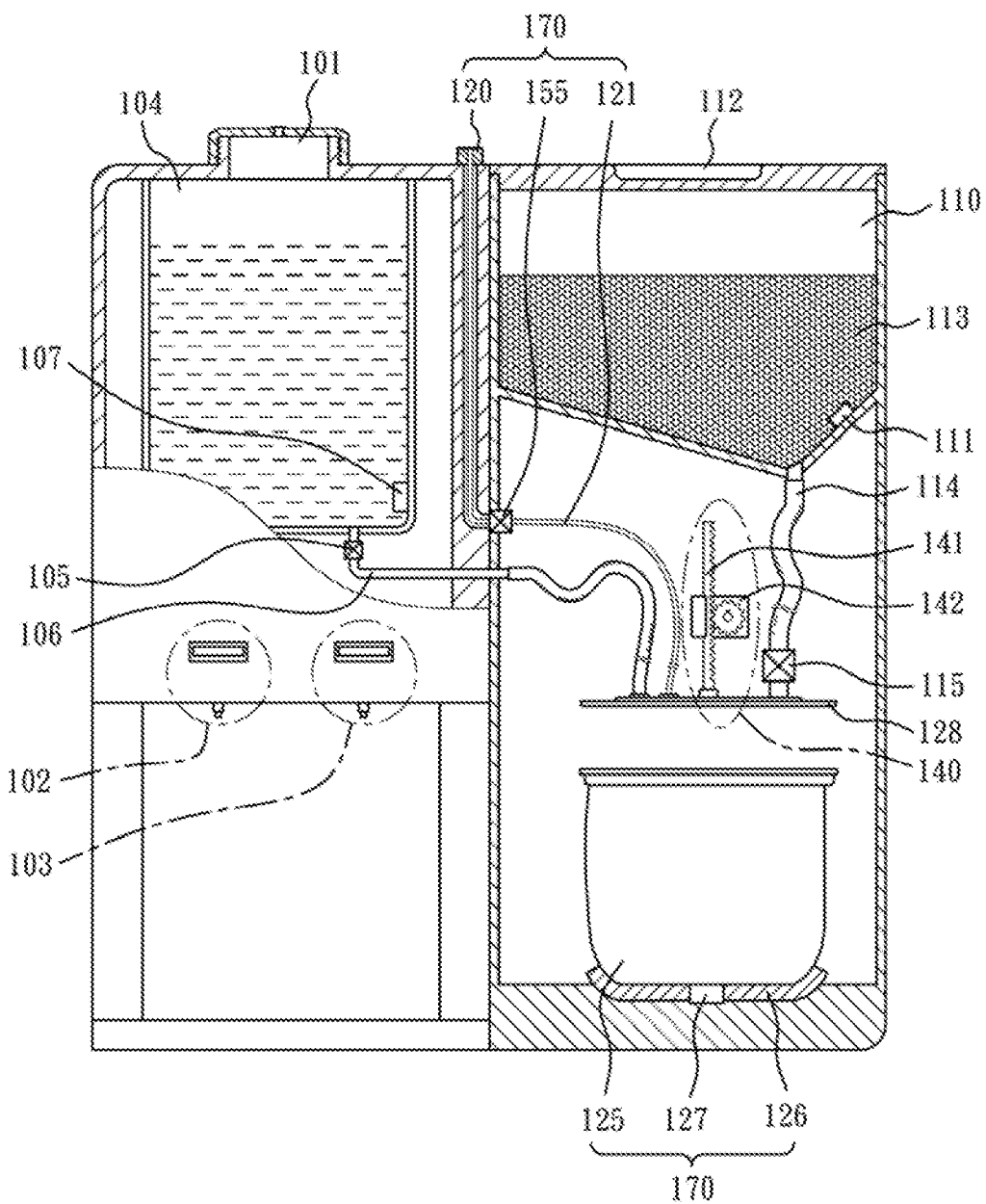
FIG. 8 is a schematic cross-sectional view of an automatic cooking apparatus capable of supplying drinking water according to the fourth embodiment of the present invention.
Figure 9A:
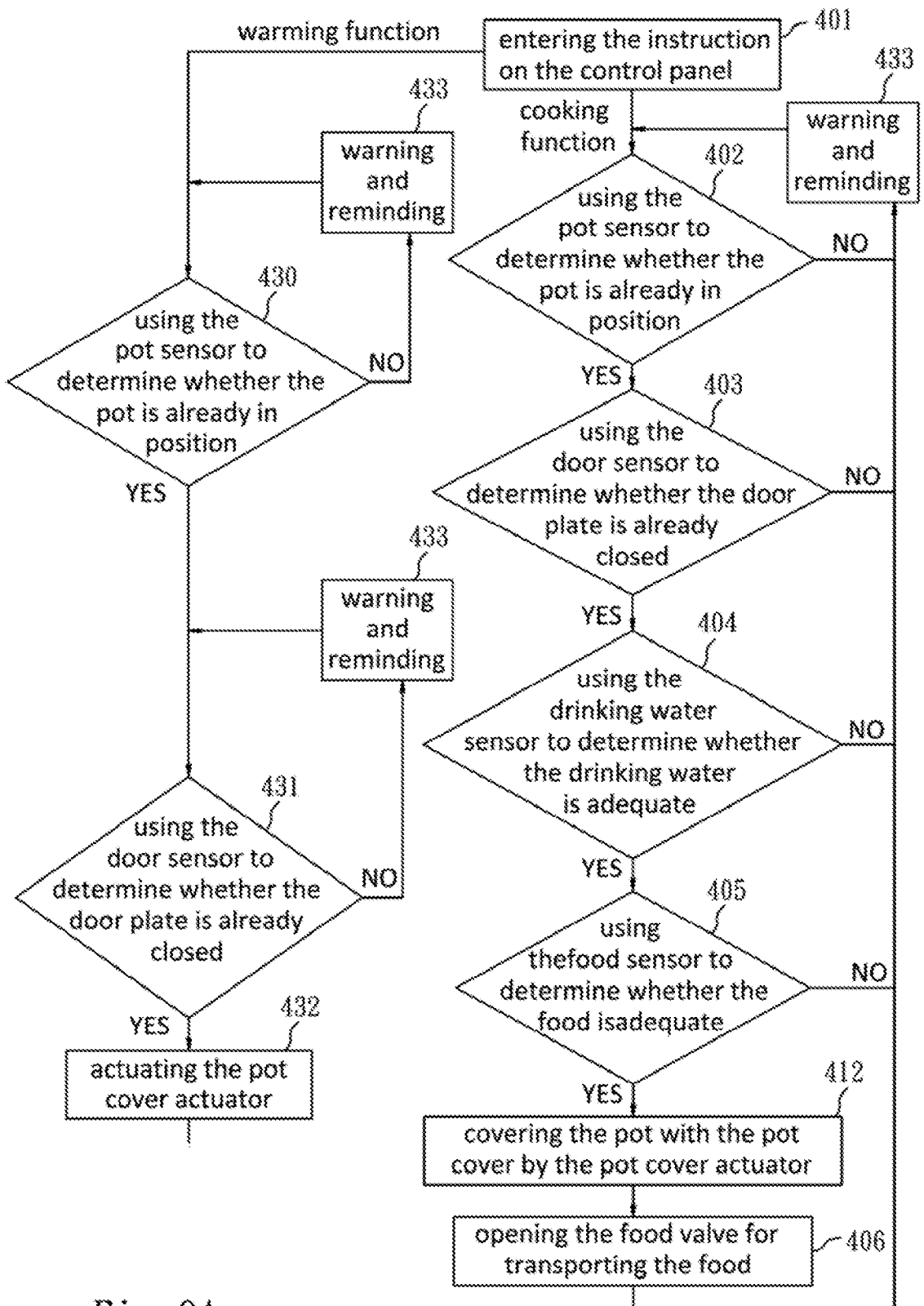
FIG. 9A, FIG. 9B and FIG. 9C illustrate a flow chart showing the operation of the automatic cooking apparatus capable of supplying drinking water according to the fourth embodiment of the present invention.
Figure 9B:
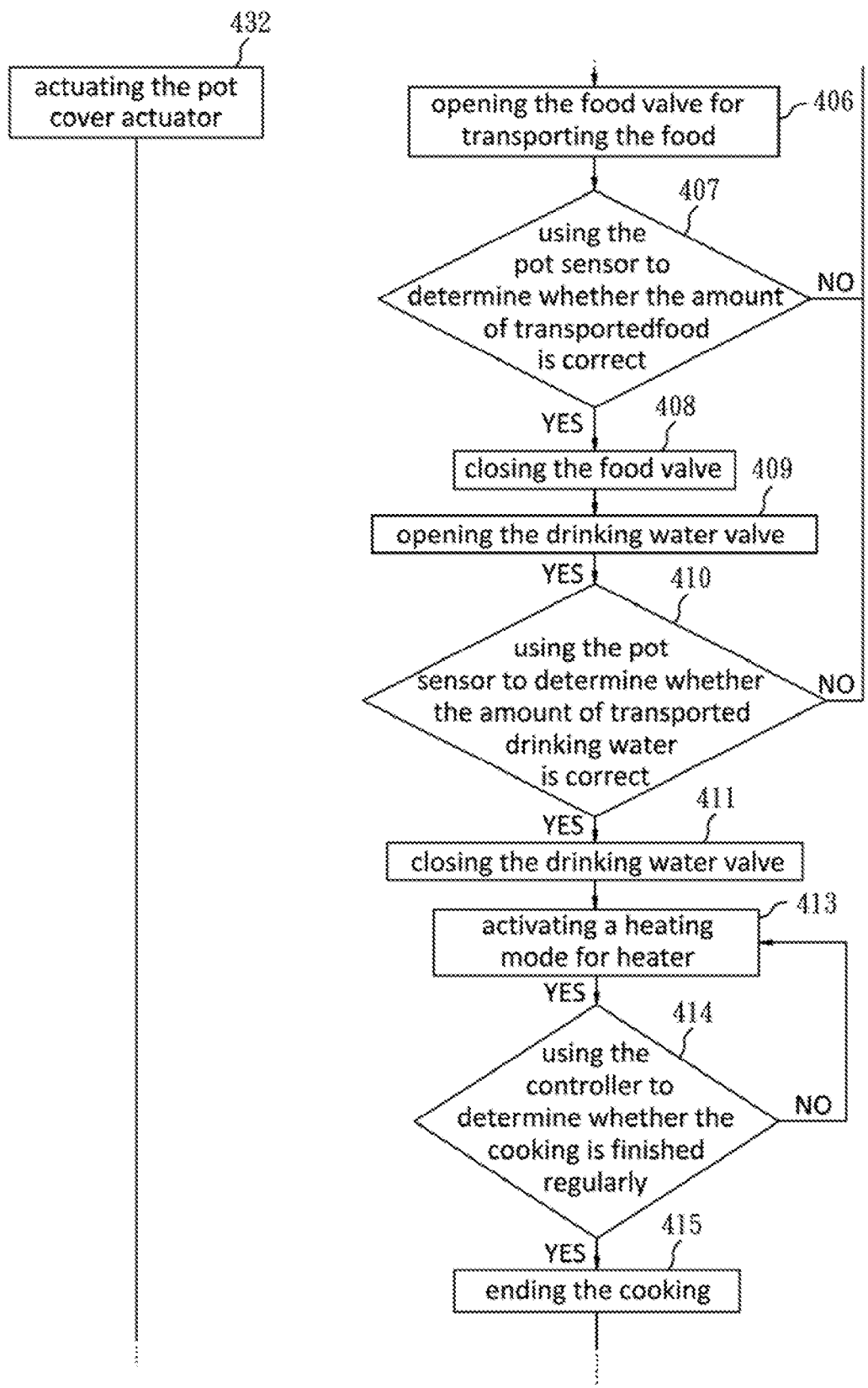
Figure 9C:
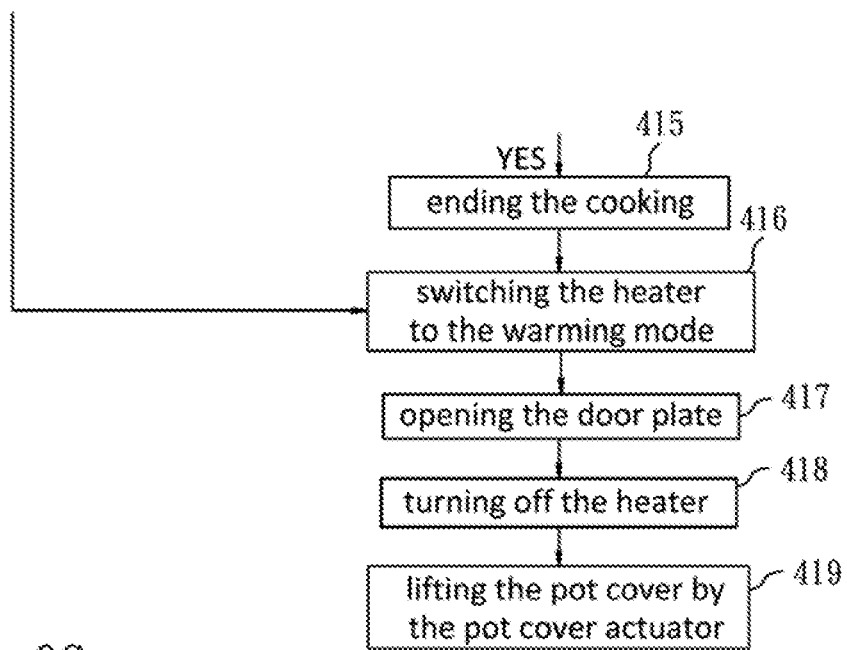

The fourth embodiment of the present invention can be comprehended by referring to FIG. 8, FIG. 9A, FIG. 9B and FIG. 9C. FIG. 8 is a schematic cross-sectional view of an automatic cooking apparatus capable of supplying drinking water according to the fourth embodiment of the present invention. FIG. 9A, FIG. 9B and FIG. 9C illustrate a flow chart showing the operation of the automatic cooking apparatus capable of supplying drinking water according to the fourth embodiment of the present invention. Continued from the above, the difference between the third embodiment and the fourth embodiment is the change of the pot cover actuator.

In the fourth embodiment, the pot cover actuator 140 belongs to a power transmission mechanism such as a gear wheel including a track 141 and a gear motor 142, and thus the movement of the pot cover 128 is a vertical path, which is moving up and down. As shown in FIG. 8, the pot cover 128 further includes a first hole, a second hole and a third hole, wherein the first hole connected with the steam output tube 121, the second hole connected with the drinking water output tube 106, and the third hole connected with the food output member 114. As the pot cover actuator 140 actuates the pot cover 128 moving up and down, a flexible tube or an appropriate length tube can be used in the steam output tube 121, the drinking water output tube 106 and the food output member 114. Of course, as described above, the steam output port 120 can make a confined space with a latch in the pot 125 in accordance with needs for braising food. Based on the above, the operation processes of the fourth embodiment and the third embodiment are not quite the same, please refer to FIG. 9A, FIG. 9B, and FIG. 9C for understanding the operation processes.

Before cooking, the preparation steps are the same, and the warming function is the same, and step 401 to step 405 of the cooking function are also the same. Thus, please directly see step 405 of FIG. 9A. Step 405 is performed for using the food sensor 111 to determine whether the food is adequate. When the result of step 405 is yes, the pot cover 128 is covered pot 125 by the pot cover actuator (step 412), and the food valve 115 is opened for transporting the food (step 406), and then step 407 is performed for using the pot sensor 127 to determine whether the amount of transported food is correct. When the result of step 407 is yes, the food valve 115 is closed (step 408), and the drinking water valve 105 is opened for transporting the drinking water (step 409). Thereafter, step 410 is performed for using the pot sensor 127 to determine whether the amount of transported drinking water is correct. When the result of step 410 is yes, the drinking water valve 105 is closed (step 411), and a heating mode is activated for the heater 126 (step 413). Then, step 414 is performed for using the controller 130 to determine whether the cooking is finished regularly. When the result of step 414 is yes, the cooking is ended (step 415), and the heater 126 is switched to the warming mode (step 416), and the door plate 123 is opened (step 417), and the heater 126 is turned off for safety reason (step 418), and the pot cover 128 is lifted by the pot cover actuator (step 419).

In the entire operation process, as long as abnormality occurs, warning and reminding will be issued to the user (step 433), and then the initial state is returned for restarting the aforementioned steps and processes, thus ensuring that every spare item has been well prepared before entering the heating mode or the warming mode, and also for safety reason. In addition, as shown in FIG. 9A, FIG. 9B and FIG. 9C, although the food and the drinking water are sensed after the door plate is closed, yet step 403 also can be performed later in accordance with the user's habits.

Therefore, in the first embodiment the pot cover is not needed; in the second embodiment, the confined space is constructed by the pot and the partition; in the third embodiment, the confined space is constructed by covering the pot with the pot cover, wherein the drinking water and the food have to be put first and then covers the pot with the pot cover, in the fourth embodiment, the confined space is also constructed by covering pot with the pot cover, wherein the pot has to be covered with the pot cover first and then puts the drinking water and the food.

As can be known form the aforementioned embodiments of the automatic cooking apparatus capable of supplying drinking water of the present invention, the processes of food cooking, drinking water supplying, heating, warming etc. are assembled in an electrical apparatus controlled by a automation supplying drinking water directly, which can improve the trivial process of using conventional electrical rice-cooker or electrical cooker in which a measuring cup is still needed for measuring the amounts of food and water by manpower. Therefore, the present invention can directly introduce in required water by using a simple controller (even only using a button) to intelligently control the ratio of food and water during cooking, thereby achieving a convenient, time-saving and delicious cooking.

Figure 10:
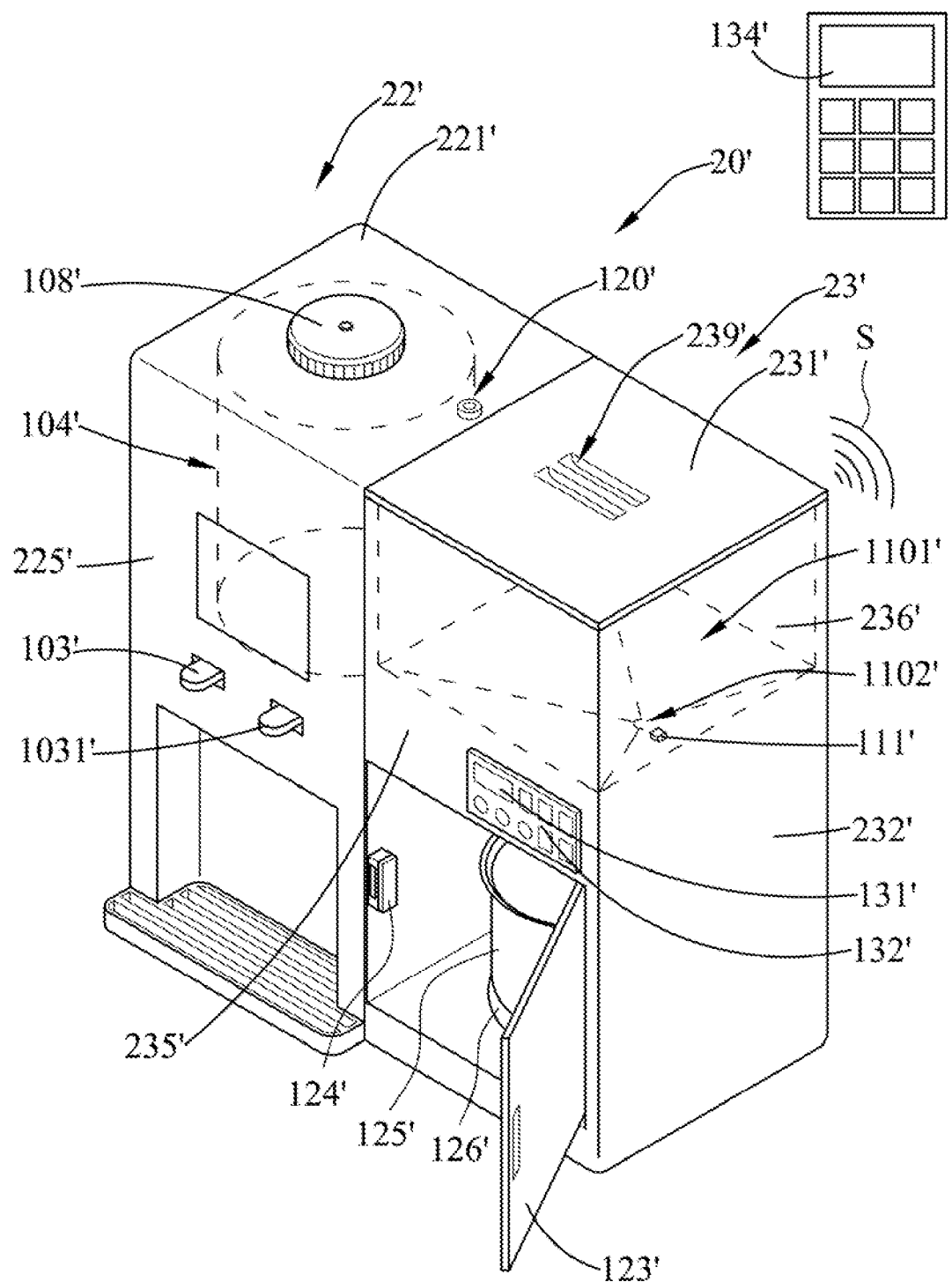
FIG. 10 is a perspective view of an automatic cooking apparatus according to a fifth preferred embodiment of the present invention.
Figure 11:
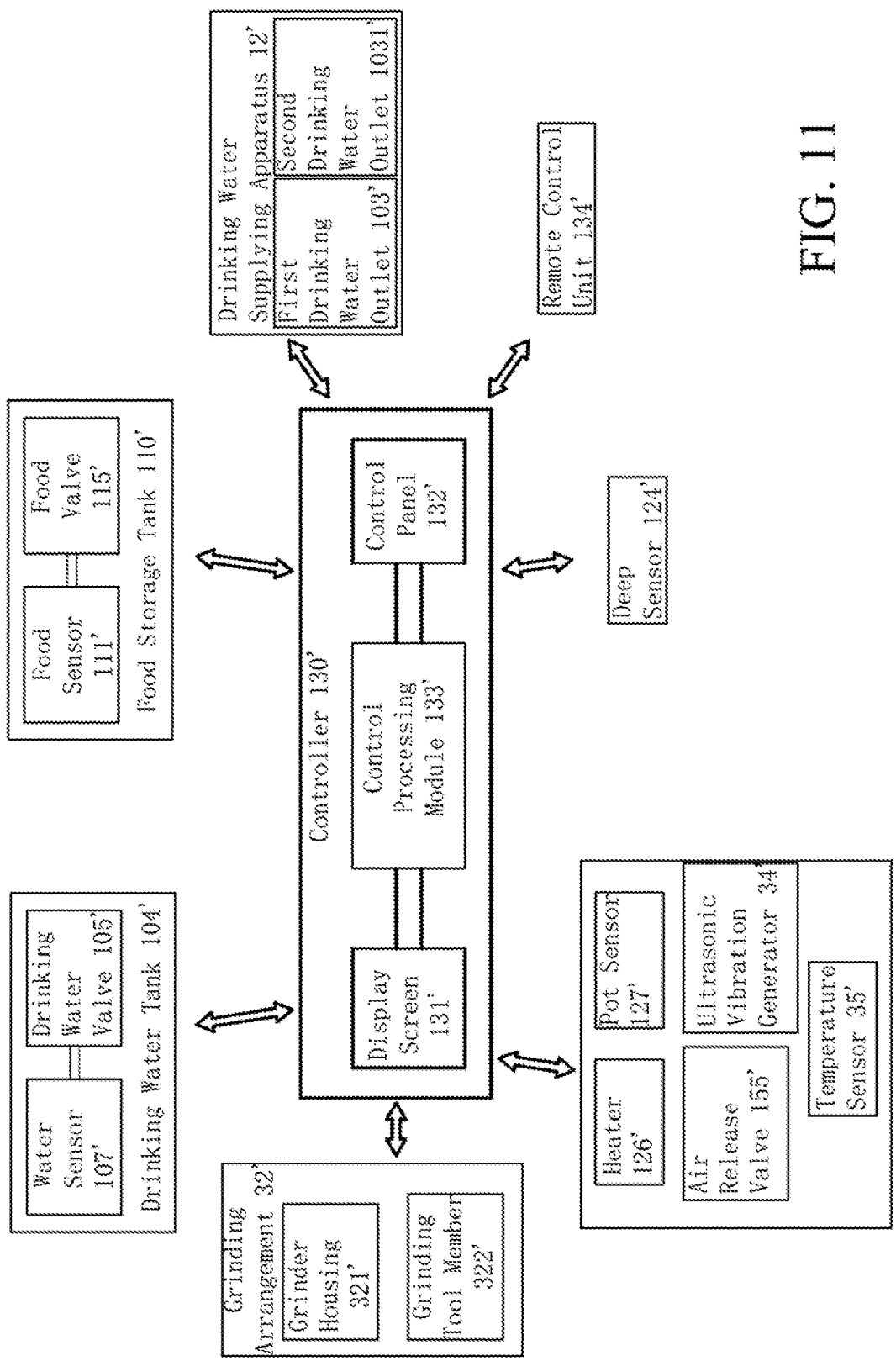
FIG. 11 is a block diagram of the automatic cooking apparatus according to the fifth preferred embodiment of the present invention.
Figure 12:
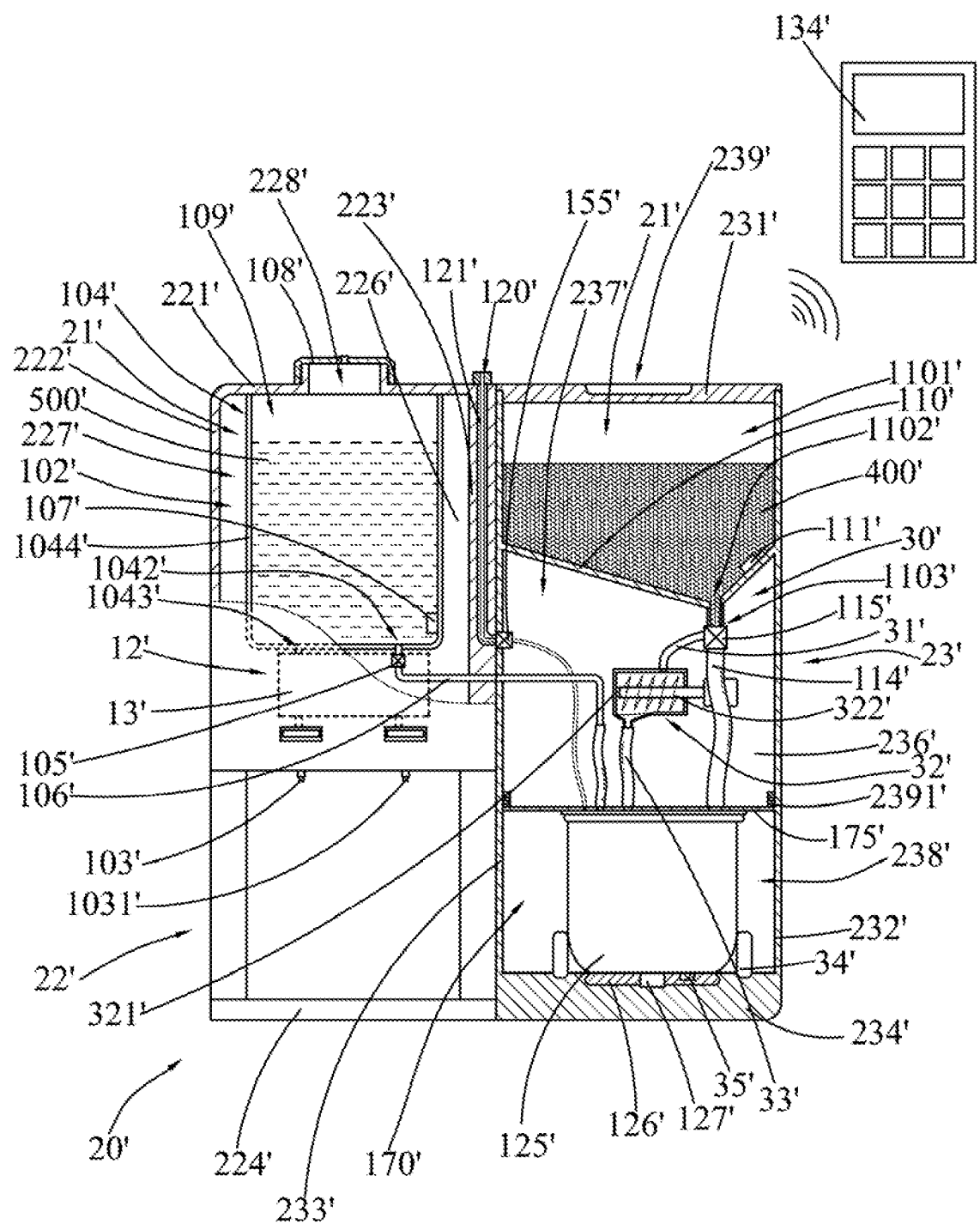
FIG. 12 is a sectional side view of the automatic cooking apparatus according to the fifth preferred embodiment of the present invention.

Referring to FIG. 10 to FIG. 12 of the drawings, an automatic cooking apparatus according to a fifth preferred embodiment of the present invention is illustrated. Broadly, the automatic cooking apparatus comprises a main housing 20' having a receiving cavity 21', a drinking water supply unit 102', and a cooking apparatus 30'.

The drinking water supply unit 102' comprises a drinking water tank 104', and drinking water supplying apparatus 12'. The drinking water tank 104' is supported in the receiving cavity 21', and has a drinking water cavity 109' for storing a predetermined amount of drinking water 500', a first water dispensing outlet 1042' and a second water dispensing outlet 1043'. The drinking water accommodated in the drinking water cavity 109' is arranged to be selectively dispensed out of the drinking water cavity 109' through at least one of the first water dispensing outlet 1042' and the second water dispensing outlet 1043'.

The drinking water supplying apparatus 12' is supported in the receiving cavity 21' and comprises a water delivering unit 13' connected to the second water dispensing outlet 1043' of the drinking water tank 104', and at least a first drinking water outlet 103' provided on the main housing 20' and connected to the water delivering unit 13'.

The cooking apparatus 30' comprises a food storage tank 110' and a cooking unit 170'. The cooking unit 170' comprises a pot 125', a heater 126', and a controller 130'. The food storage tank 110' is supported in the receiving cavity 21', and has a food storage cavity 1101' for storing a predetermined amount of food items 400, and a food dispensing outlet 1102'. The food items 400 are arranged to be dispensed out of the food storage cavity 1101' through the food dispensing outlet 1102'.

The pot 125' is provided in the receiving cavity 21' at a position corresponding to the food dispensing outlet 1102' and the first water dispensing outlet 1042', in such a manner that the water and the food contained in the drinking water tank 104' and the food storage tank 110' are capable of being dispensed to the pot 125' through the food dispensing outlet 1102' and the first water dispensing outlet 1042'.

The heater 126' is provided in the receiving cavity 21', and is thermally communicated with the pot 125' so as to increase the temperature of the pot 125' for cooking the food items disposed therein.

The controller 130' is electrically connected to the drinking water supply unit 102' and the cooking unit 30', and operates the automatic cooking apparatus on at least one of a water supplying mode and a cooking mode, wherein in the water supplying mode, the drinking water supply unit 102' is arranged to dispense water from the drinking water tank 104' through the first drinking water outlet 103', wherein in the cooking mode, the drinking water and the food items stored in the drinking water tank 104' and the food storage tank 110' are controllably dispensed to the pot 125' through the first water dispensing outlet 1042' and the food dispensing outlet 1102' respectively. The pot 125' is arranged to be heated up by the heater 126' for cooking the food items and the water in the pot 125'.

According to the fifth preferred embodiment of the present invention, the main housing 20' comprises a first housing unit 22' and a second housing unit 23' for accommodating the drinking water supply unit 102' and the cooking apparatus 30' respectively. The first housing unit 22' and the second housing unit 23' may be attached with each other in a side-by-side manner, as shown in FIG. 10 of the drawings. Alternatively, the first housing unit 22' and the second housing unit 23' may also be arranged or connected in a top-bottom manner, or in any other configurations.

The first housing unit 22' has a first top wall 221', a first outer sidewall 222', a first inner sidewall 223', a first bottom wall 224', a first front wall 225' and a first rear wall 226' connected together to form a first accommodating compartment 227' within the first top wall 221', the first outer sidewall 222', the first inner sidewall 223', the first bottom wall 224', the first front wall 225' and the first rear wall 226'. The drinking water supply unit 102' is supported in the first accommodating compartment 227'.

The second housing unit 23' has a second top wall 231', a second outer sidewall 232', a second inner sidewall 233', a second bottom wall 234', a second front wall 235' and a second rear wall 236' connected together to form a second accommodating compartment 237' within the second top wall 231', the second outer sidewall 232', the second inner sidewall 233', the second bottom wall 234', the second front wall 235' and the second rear wall 236'. The cooking apparatus 30' is supported in the second accommodating compartment 237'.

It is worth mentioning that the first housing unit 22' and the second housing unit 23' may be two separate elements connected in a side-by-side manner to form the main housing 20'. The first inner sidewall 223' and the second inner sidewall 233' divides the receiving cavity 21' into the first accommodating compartment 227' and the second accommodating compartment 237'. Alternatively, the first housing unit 22' and the second housing unit 23' may form an integral body so that the first inner sidewall 223' and the second inner sidewall 233' form an integral common boundary which divides the receiving cavity 21' into the first accommodating compartment 227' and the second accommodating compartment 237'.

As shown in FIG. 12 of the drawings, the drinking water tank 104' comprises a water tank member 1044' supported in the first accommodating compartment 227', wherein the drinking water cavity 109' is formed within the water tank member 1044'. The first housing unit 22' further has a first opening 228' formed on the first top wall 221' of the first housing unit 22' and communicated with the drinking water cavity 109'. A user is able to pour drinking water into the drinking water cavity 109' through the first opening 228'. The drinking water tank 104' further comprises a top cap 108' detachably attached on the first top wall 221' so as to selectively cover the first opening 228'. A valve may be equipped on the top cap 108' for controllably releasing pressure in the drinking water tank 104'.

Moreover, the first water dispensing outlet 1042' and the second water dispensing outlet 1043' are provided on the water tank member 1044' so that the drinking water stored in the drinking water cavity 109' can be guided to flow out thereof through the first water dispensing outlet 1042' and the second water dispensing outlet 1043'.

The drinking water supplying apparatus 12' comprises a second drinking water outlet 1031' provided on the first front wall 225' of the first housing unit 22' and connected to the water delivering unit 13'. The drinking water stored in the drinking water tank 104' is guided to controllably enter the water delivering unit 13' which is arranged to heat up or cool down the drinking water. The drinking water entering the water delivering unit 13' is then dispensed out of the automatic cooking apparatus through at least one of the first drinking water outlet 103' and the second drinking water outlet 1031'. In this preferred embodiment, the first drinking water outlet 103' and the second drinking outlet 1031' are arranged to dispense cold water and hot water respectively. It is worth mentioning that the water delivering unit 13' may be embodied as a conventional heating element which is arranged to heat up or cool down while the drinking water is stored in the drinking water tank 104'. Alternatively, the drinking water may be guided to flow through the water delivering unit 13' which heats up or cools down the drinking water.

The drinking water supply unit 102' further comprises a drinking water output tube 106' having one end connected to the first water dispensing outlet 1042', and another end extended to reach the pot 125' of the cooking apparatus 30' through the first inner sidewall 223' of the first housing unit 22' and the second inner sidewall 233' of the second housing unit 23', wherein a predetermined amount of drinking water stored in the drinking water tank 104' is arranged to be controllably released to flow through the drinking water output tube 106' for supplying drinking water to the cooking apparatus 30'. The drinking water supply unit 102' further comprises a water sensor 107' disposed on a bottom-side surface of the drinking water tank member 1044', and a drinking water valve 105' provided in the drinking water tube 106' for controlling a flow rate of the drinking water in the drinking water tube 106', thereby appropriately adjusting the amount of drinking water which is to be delivered to the pot 125'.

It is important to mention in this stage that the cooking apparatus 30' solely utilizes the drinking water supplied by the drinking water supply unit 102' for performing its cooking function. The automatic cooking apparatus of the present invention does not need to connect to any external water pipe. As such, the automatic cooking apparatus of the present invention may be conveniently set up in any location in a domestic or commercial premise.

On the other hand, the food storage tank 110' of the cooking apparatus 30' is provided in an upper portion of the second housing unit 23', and defines the food storage cavity 1101' within the food storage tank 110'. A predetermined amount of food items 400', such as rice, soy, or red beans may be accommodated in the food storage cavity 1101'. The food items 400' are readily dispensed to the pot 125'.

Moreover, the second housing unit 23' further comprises a partition 175' provided in the second accommodating compartment 237' to define a cooking cavity 238' in the second accommodating compartment 237'. Referring to FIG. 12 of the drawings, the cooking cavity 238' is defined between the partition 175' and the second bottom wall 234', wherein the pot 125' is normally placed in the cooking cavity 238'. The second housing unit 23' further comprises a door plate 123' operatively provided on the second front wall 235' at a bottom portion of the second housing unit 23' for selectively closing or opening the cooking cavity 238'. The second housing unit 23' further comprises a door sensor 124' supported in the cooking cavity 238' for sensing an operation status or a position of the door plate 123'.

The second housing unit 23' further comprises a resilient member 2391' mounted to the partition 175' in such a manner that when the door plate 123' is closed, the resilient member 2391' is arranged to exert a downward biasing force so as to push the resilient member 2391' to bias against the opening of the pot 125' so as to effectively seal the interior of the pot 125' when the drinking water valve 105', food valve 115', and the air release valve 155' are all closed.

As shown in FIG. 12 of the drawings, the food storage tank 110' further has a contracted food output portion 1103' wherein the food dispensing outlet 1102' is formed in the contracted food output portion 1103'. The food storage tank 110' further comprises a food valve 115' provided in the contracted food output portion 1103' for selectively controlling a flow of the food items therethrough. The second housing unit 23' further has a food passage opening 239' formed on the second top wall 231', wherein the food passage opening 239' communicates the food storage cavity 1101' with an exterior of the second housing unit 23' so that a user is able to put a predetermined amount of food items 400' into the food storage cavity 1101' through the food passage opening 239'. Moreover, the cooking apparatus 30' further comprises a food sensor 111' provided in the food storage tank 110' for detecting the amount of food items 400' therein.

Note that the second top wall 231' may be detachably attached on the second outer sidewall 233', the second inner sidewall 234', the second front wall 235' and the second rear wall 236' for allowing a user to conveniently access the food storage cavity 1101' from an exterior of the second housing unit 23'.

The cooking apparatus 30' further comprises a first food output member 114' and a second food output member 31' connected to the food valve 115', wherein the food items 400' passing through the food valve 115' are guided to enter either the first food output member 114' or the second food output member 31'. The first food output member 114' is extended from the food valve 115' to the pot 125' through the partition 175' so that when the food items 400' are guided to flow into the first food output member 114', the food items 400' are guided to be delivered to the pot 125' for cooking by the heater 126'.

On the other hand, the cooking apparatus 30' further comprises a grinding arrangement 32' supported in the second accommodating compartment 237' of the second housing unit 23' and is connected to the second food output member 31' in such a manner that the food items 400' passing through the food valve 115' may alternatively be guided to enter the grinding arrangement 32'. In such a situation, the food items 400' will not pass through the first food output member 114'.

The grinding arrangement 32' comprises a grinder housing 321' and a tool member 322' operatively provided in the grinder housing 321', wherein the second food output member 31' is connected to the grinder housing 321' in such a manner that the food items 400' passing through the second food output member 31' are arranged to enter the grinder housing 321' for being grinded or cut into small pieces. On the other hand, the cooking apparatus 30' further comprises a third food output member 33' which is tubular in structure and has one end connected to the grinder housing 321', and another end extended to reach the pot 125' through the partition 175' so that the grinded food items are arranged to be delivered to the pot 125' through the third food output member 33'. The first through third food output member 114', 31', 33' are all tubular in structure for allowing passage of food items 400'.

According to the fifth preferred embodiment of the present invention, the food items 400' are selectively guided to either enter the pot 125' through the first food output member 114', or enter the pot 125' through the second food output member 31', the grinding arrangement 32' and the third food output member 33'.

The controller 130' is supported by the second housing unit 23', and comprises a central processing module 133' supported on the second housing unit 23', a display screen 131' provided on the second front wall 235' of the second housing unit 23' and electrically connected to the central processing module 133', and a control panel 132' also provided on the second front wall 235' of the second housing unit 23' and electrically connected to the central processing module 133'. The controller 130' may further comprises a remote control unit 134' wirelessly connected to the central processing module 133' for allowing a user to wireless control the automatic cooking apparatus of the present invention through operating on the remote control unit 134'.

The cooking apparatus 30' further comprises a steam output port 120' provided on the main housing 20', a steam output tube 121' extended from the pot 125' to the steam output port 120', and an air release valve 155' provided in the steam output tube 121'. The steam generated within the pot 125' is arranged to be ventilated out of the automatic cooking apparatus through the steam output tube 121' and the steam output port 120'.

According to the fifth preferred embodiment of the present invention, the steam output port 120' is provided on the first top wall 221' of the first housing unit 22' while part of the steam output tube 121' extends from the pot 125' and penetrates the second inner sidewall 233' and the first inner sidewall 223' to reach the steam output port 120'. The air release valve 155' is provided in the steam output tube 121' and is supported by the second inner sidewall 233' of the second housing unit 23', as shown in FIG. 12 of the drawings.

The cooking apparatus 30' further comprises a ultrasonic vibration generator 34' and a temperature sensor 35' provided underneath the pot 125' for providing ultrasonic vibration to the ingredients (i.e. the drinking water 500' and the food items 400') in the pot 125' and for measuring the temperature thereof respectively. The ultrasonic vibration generator 34' is arranged to provide enhanced mixing of ingredient in the pot 125'.

The central processing module 133' of the controller 130' is arranged to coordinate and control the entire operation of the automatic cooking apparatus. Control instructions may be entered or programed through the control panel 132' or the remote control unit 134', so that the entire cooking and grinding process can be fully automated. Specifically, the central processing module 133' is electrically connected to the water delivering unit 13', the water sensor 107', the temperature sensor 35', the pot sensor 127', the drinking water valve 105', the cooking unit 170', the grinding arrangement 32', the air release valve 155', and the food valve 115' for controlling the supply of drinking water and the food items into the pot 125', and for controlling the heating parameters of the heater 126'. Moreover, the central processing module 133' also controls the release of food items 400' into the grinding arrangement 32' through the food valve 115'. The grinding parameters of the grinding arrangement 32' is also controlled by the central processing module 133'.

Figure 13:
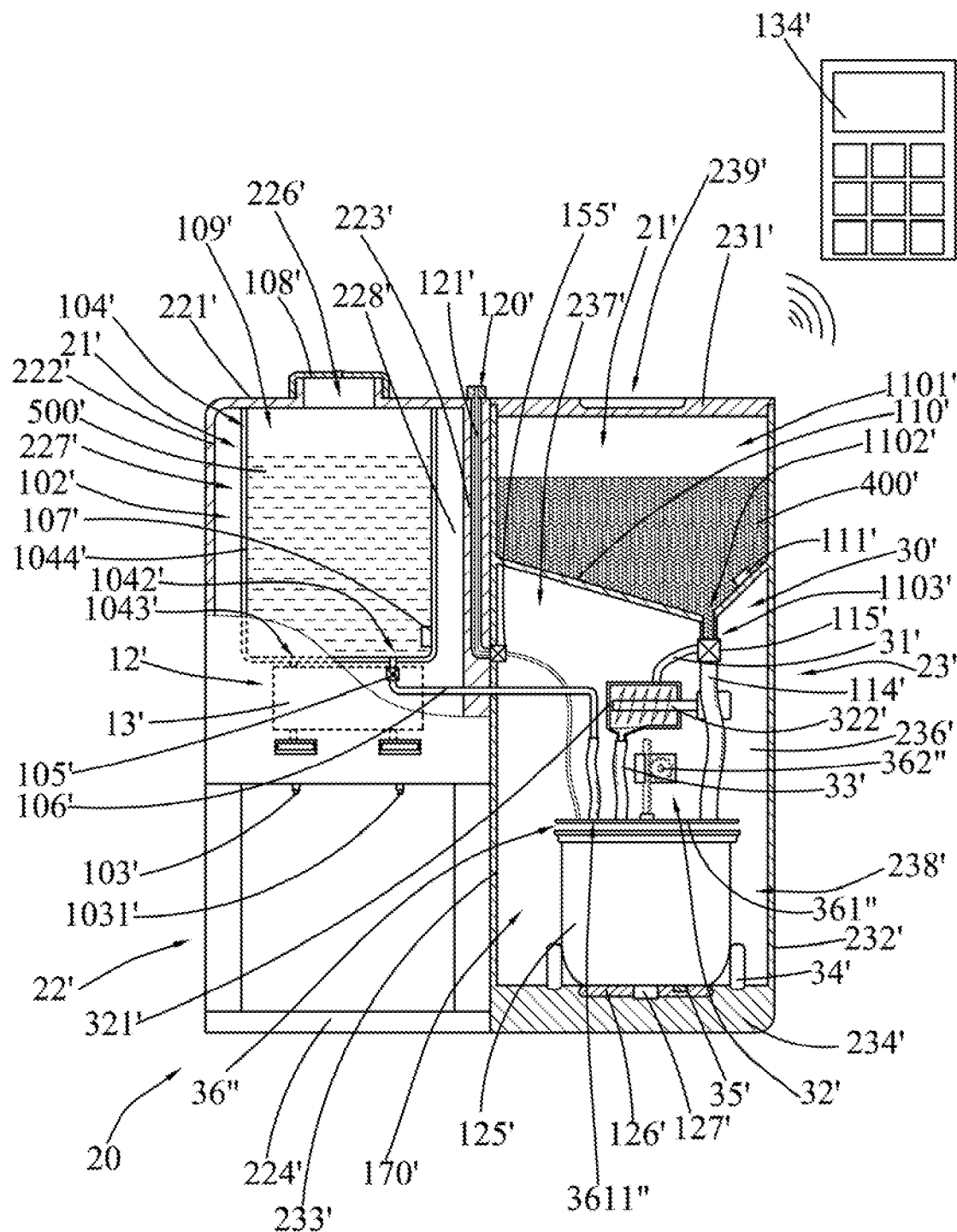
FIG. 13 is a first alternative mode of the automatic cooking apparatus according to the fifth embodiment of the present invention.

Referring to FIG. 13 of the drawings, a first alternative mode of the automatic cooking apparatus according to the fifth preferred embodiment of the present invention is illustrated. The first alternative mode is similar to the fifth preferred embodiment as described above, except the absence of the partition 175' and that the cooking apparatus 30" further comprises a pot cover arrangement 36". The pot cover arrangement 36" comprises a pot cover 361" and an actuation device 362" operatively mounted in the second housing unit 23' and electrically connected to the central processing module 133' for controllably moving the pot cover 361" to open or close the pot 125'. The pot cover 361" has a plurality of passage openings 3611" wherein each of the steam output tube 121', the drinking water output tube 106', the third food output member 33', and the first food output member 114' may pass through the pot cover 361" through the corresponding passage opening 3611".

Figure 14:
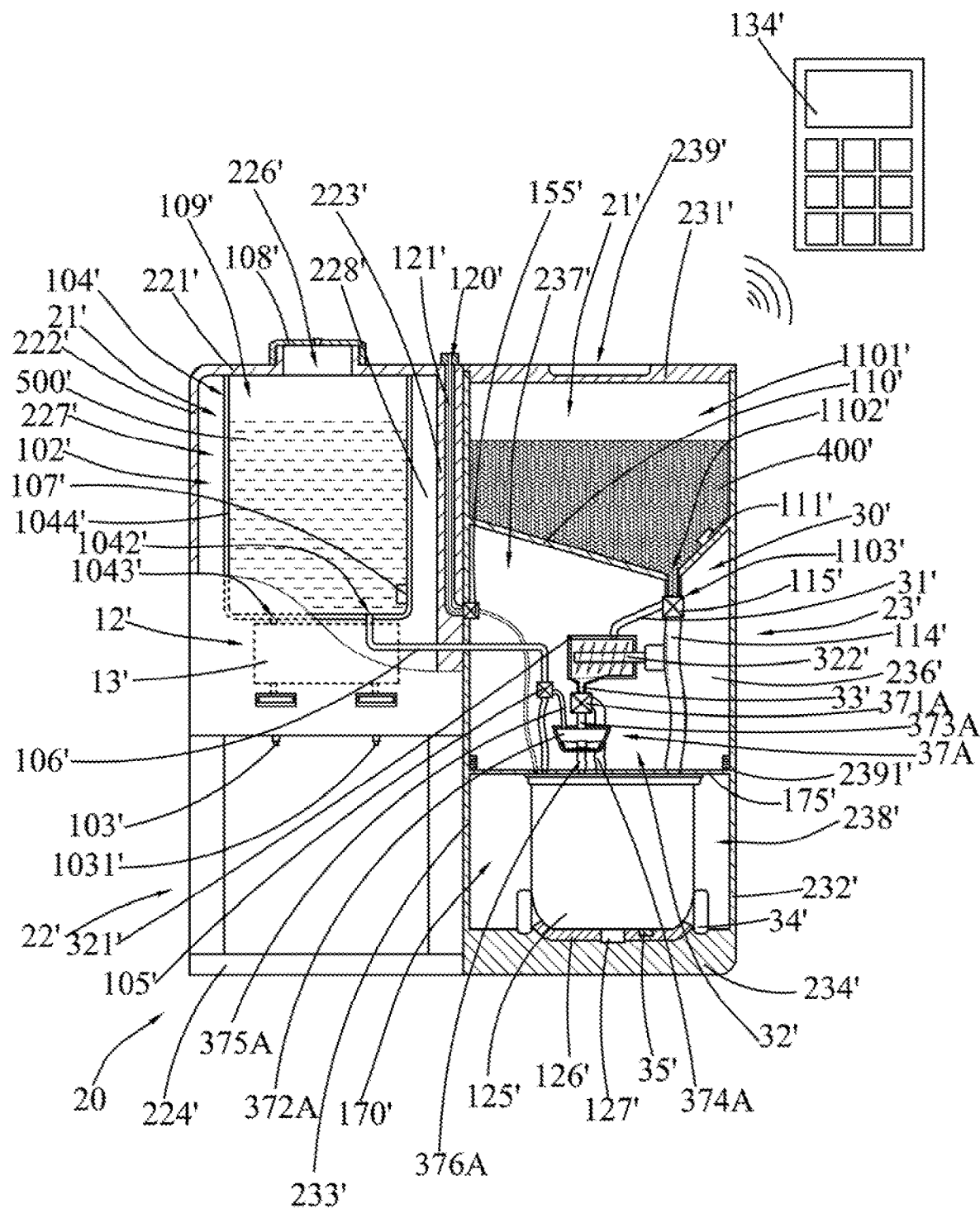
FIG. 14 is a second alternative mode of the automatic cooking apparatus according to the fifth embodiment of the present invention.

Referring to FIG. 14 of the drawings, a second alternative mode of the automatic cooking apparatus according to the fifth preferred embodiment of the present invention is illustrated. The second alternative mode is similar to the fifth preferred embodiment as described above, except that the cooking apparatus 30' further comprises a filter arrangement 37A in which the grinder housing 321' is connected to the filter arrangement 37A. According to the second alternative mode, the filter arrangement 37A comprises a grinder outlet valve 371A, a mixer-filtering unit 372A, a first connecting tube 373A connected between the grinder outlet valve 371A and the mixer-filtering unit 372A, a second connecting tube 376A connected between the mixer-filtering unit 372A to the pot 125' through the partition 175', and a water supplying tube 375A connected between the drinking water valve 105' and the mixer-filtering unit 371A.

As shown in FIG. 14 of the drawings, the grinder outlet valve 371A is arranged to selectively allow grinded food items to selectively pass through one of the first connecting tube 373A and the second connecting tube 374A. When the grinded food items are guided to pass through the first connecting tube 373A, the grinded food items will enter the mixer-filter unit 372A. When the grinded food items are guided to pass through the second connecting tube 374A, they will enter the pot 125' directly. On the other hand, the drinking water valve 105' is arranged to allow the drinking water to selectively remain in the drinking water output tube 106', to pass through the water supplying tube 375A, or to pass through the drinking water output tube 106'. The drinking water remaining in the drinking water output tube 106' is arranged to enter the pot 125'. However, the drinking water passing through the water supplying tube 375A is arranged to enter the mixer-filter unit 372A. The mixer-filter unit 372A is arranged to mix the drinking water with the grinded food items for producing a solution-like food ingredient. The mixed solution is then guided to pass through a pot connecting tube 376A which connects the mixer-filter unit 372A to the pot 125' through the partition 175'.

As a result, drinking water may be either directly dispensed to the pot 125' or to the mixer-filter unit 372A. On the other hand, the food items may be directly dispensed to the pot 125' through the first food output member 114'. Alternatively, the food items may be dispensed to the grinding arrangement 32' through the second food output member 31'. The grinded food items may pass through the third food output member 33' and the grinder outlet valve 371A and enter the pot 125' directly through the second connecting tube 374A. Alternatively, the grinded food items may pass through the third food output member 33' and the grinder outlet valve 371A and the mixer-filter unit 372A and the second connecting tube 376A and enter the pot 125' for being mixed with the drinking water. The exact route taken by the drinking water and the food items may be pre-programmed and controlled by the central processing module 133'.

Figure 15:
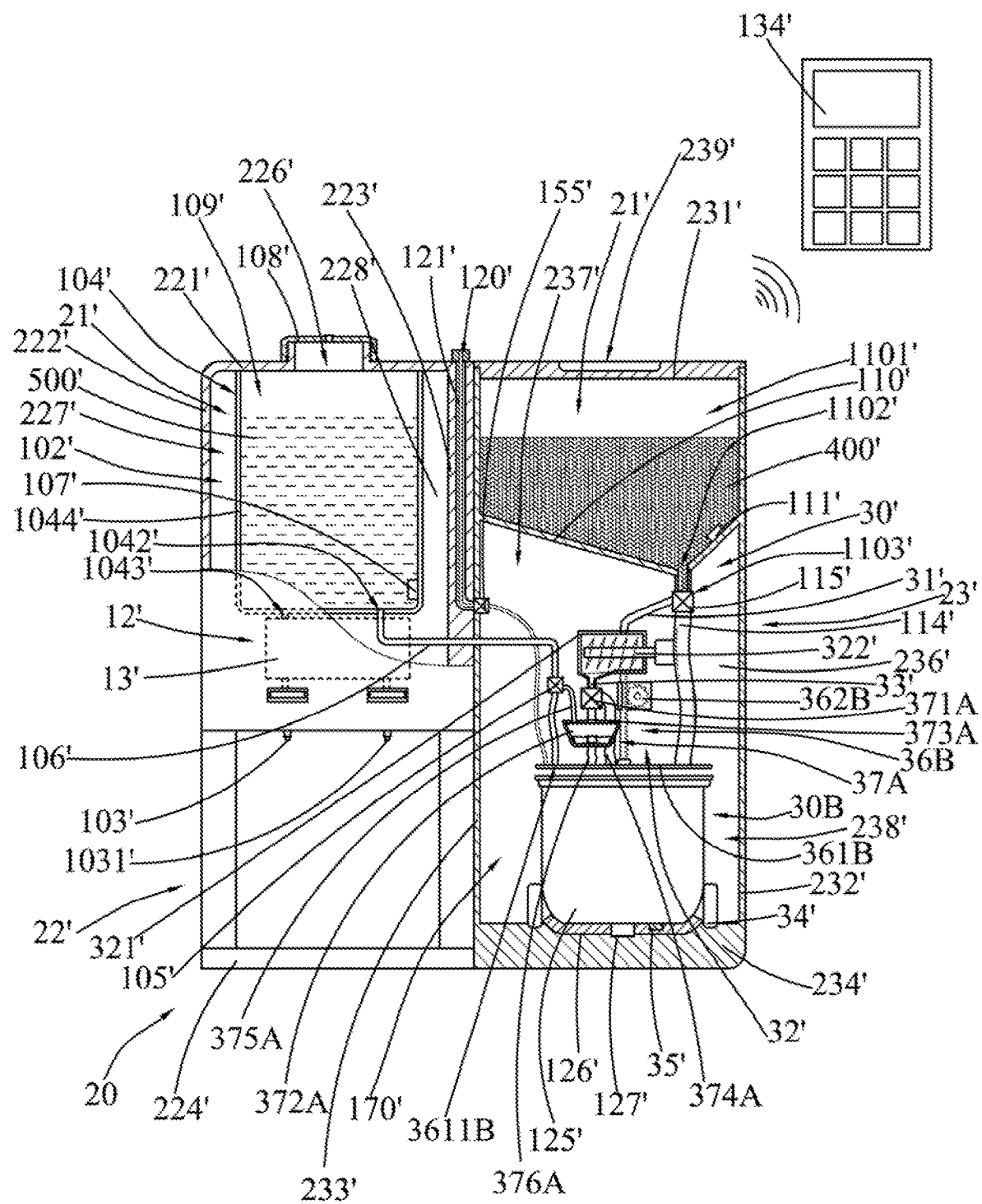
FIG. 15 is a third alternative mode of the automatic cooking apparatus according to the fifth embodiment of the present invention.

Referring to FIG. 15 of the drawings, a third alternative mode of the automatic cooking apparatus according to the fifth preferred embodiment of the present invention is illustrated. The third alternative mode is similar to the second alternative mode as described above, except the absence of the partition 175' and that the cooking apparatus 30B further comprises a pot cover arrangement 36B. The pot cover arrangement 36B comprises a pot cover 361B and an actuation device 362B operatively mounted in the second housing unit 23' and electrically connected to the central processing module 133' for controllably moving the pot cover 361B to open or close the pot 125'. The pot cover 361B has a plurality of passage openings 3611B wherein each of the steam output tube 121', the drinking water output tube 106', the pot connecting tube 376A, the second connecting tube 374A, and the first food output member 114' may pass through the pot cover 361B through the corresponding passage opening 3611B.

Figure 16:
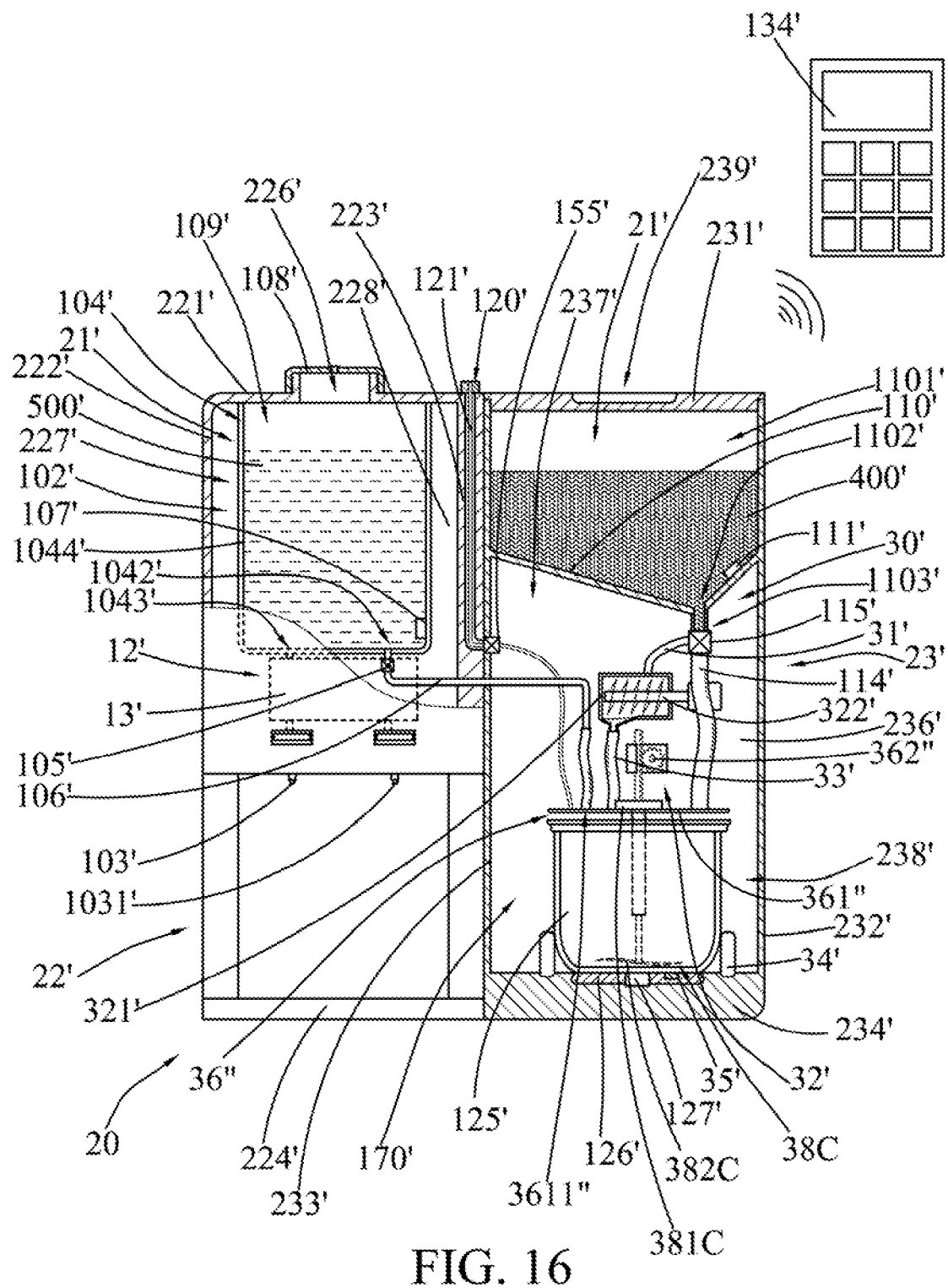
FIG. 16 is a fourth alternative mode of the automatic cooking apparatus according to the fifth embodiment of the present invention, illustrating that the food processing tool is a knife.
Figure 17:
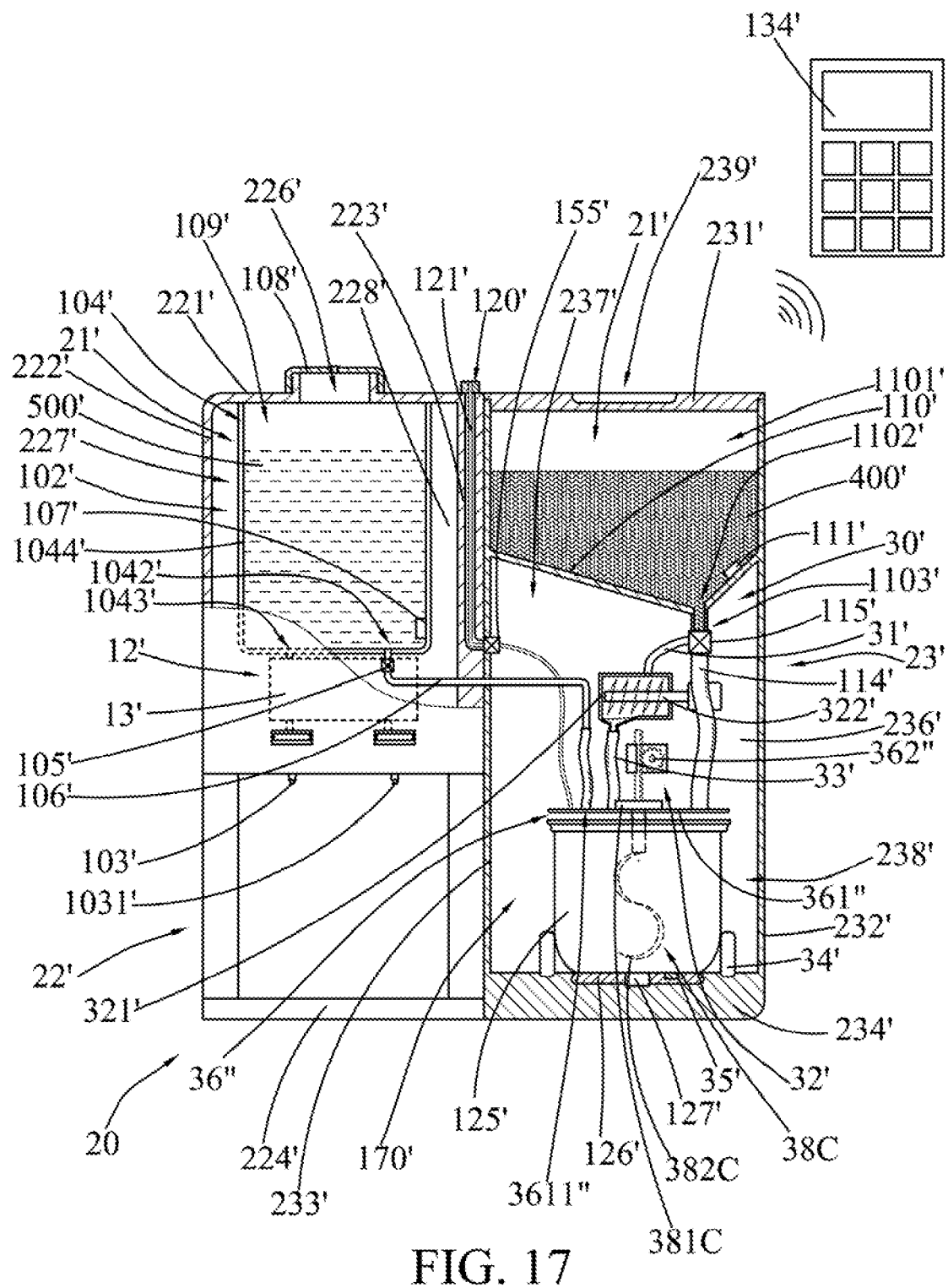
FIG. 17 is a schematic diagram of the fourth alternative mode of the automatic cooking apparatus according to the fifth embodiment of the present invention, illustrating that the food processing tool is an S-shaped mixing bar.

Referring to FIG. 16 to FIG. 17 of the drawings, a fourth alternative mode of the automatic cooking apparatus according to the fifth preferred embodiment of the present invention is illustrated. The fourth alternative mode is similar to the first alternative mode as described above, except the cooking apparatus 30' further comprises a food processing device 38C. In this fourth alternative mode, the food processing device 38C is provided on the pot cover 361", and comprises a driving unit 381C provided on the pot cover 361", and a food processing tool 382C rotatably extended from the driving unit 381C for performing additional process on the food items in the pot 125'.

It is worth mentioning that the food processing tool 382C may be embodied as a wide variety of tools for performing additional processes on the food items. For example, as shown in FIG. 16 of the drawings, the food processing tool 382C may be embodied as a knife for further cutting the food items in the pot 125'. On the other hand, as shown in FIG. 17 of the drawings, the food processing tool 382C may be embodied as a curved (such as S-shaped) mixing bar for thoroughly mixing the food items in the pot 125'.

Figure 18A:
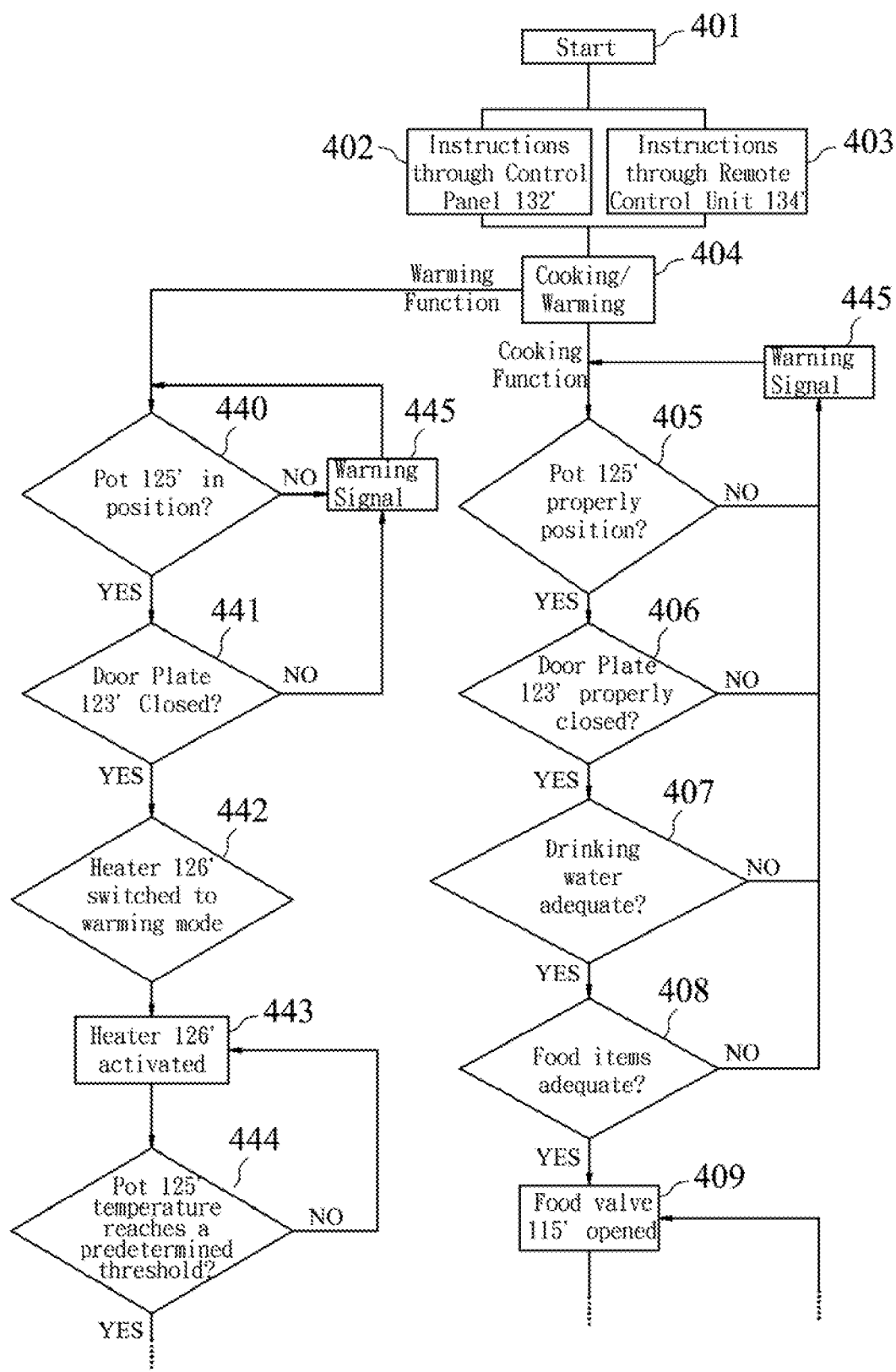
FIG. 18A to FIG. 18C illustrate a flow chart showing the operation of the automatic cooking apparatus according to the third alternative mode of the fifth embodiment of the present invention.
Figure 18B:
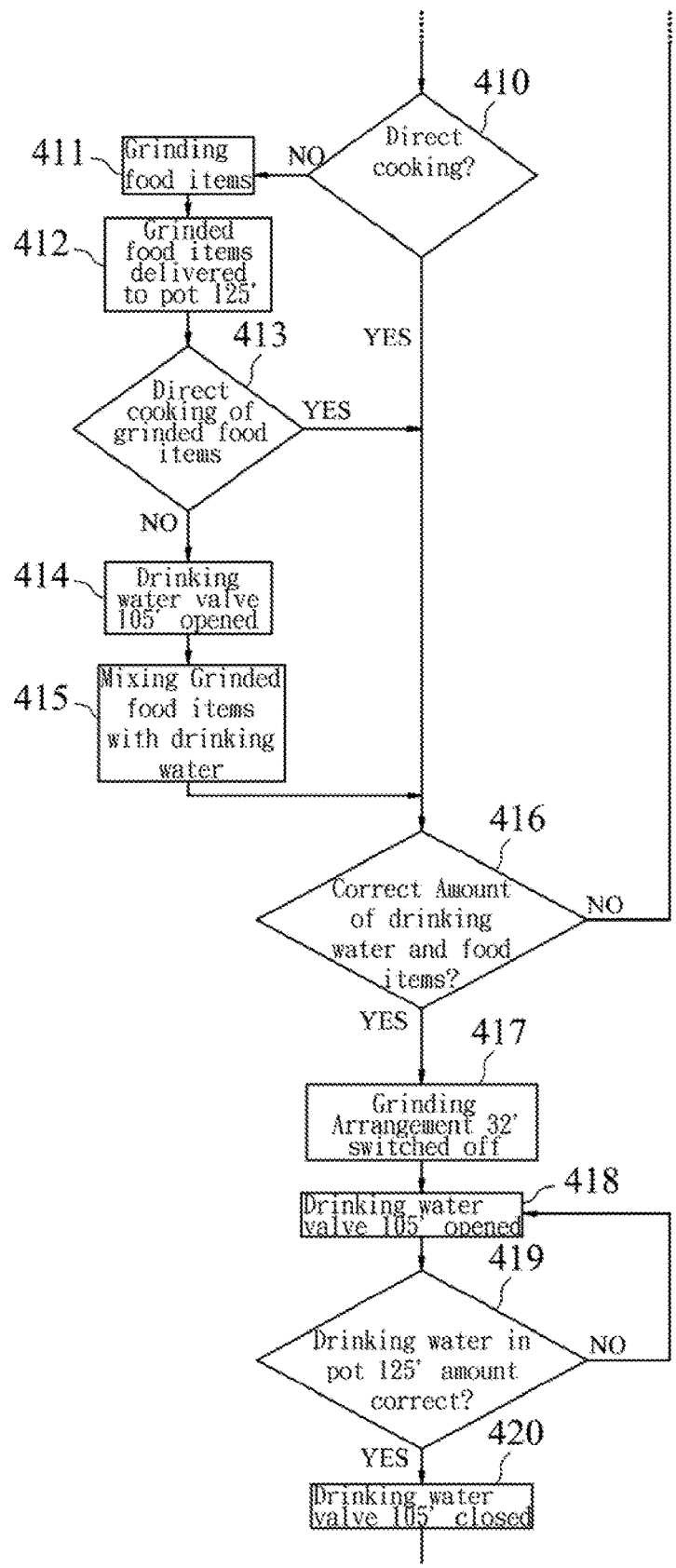
Figure 18C:
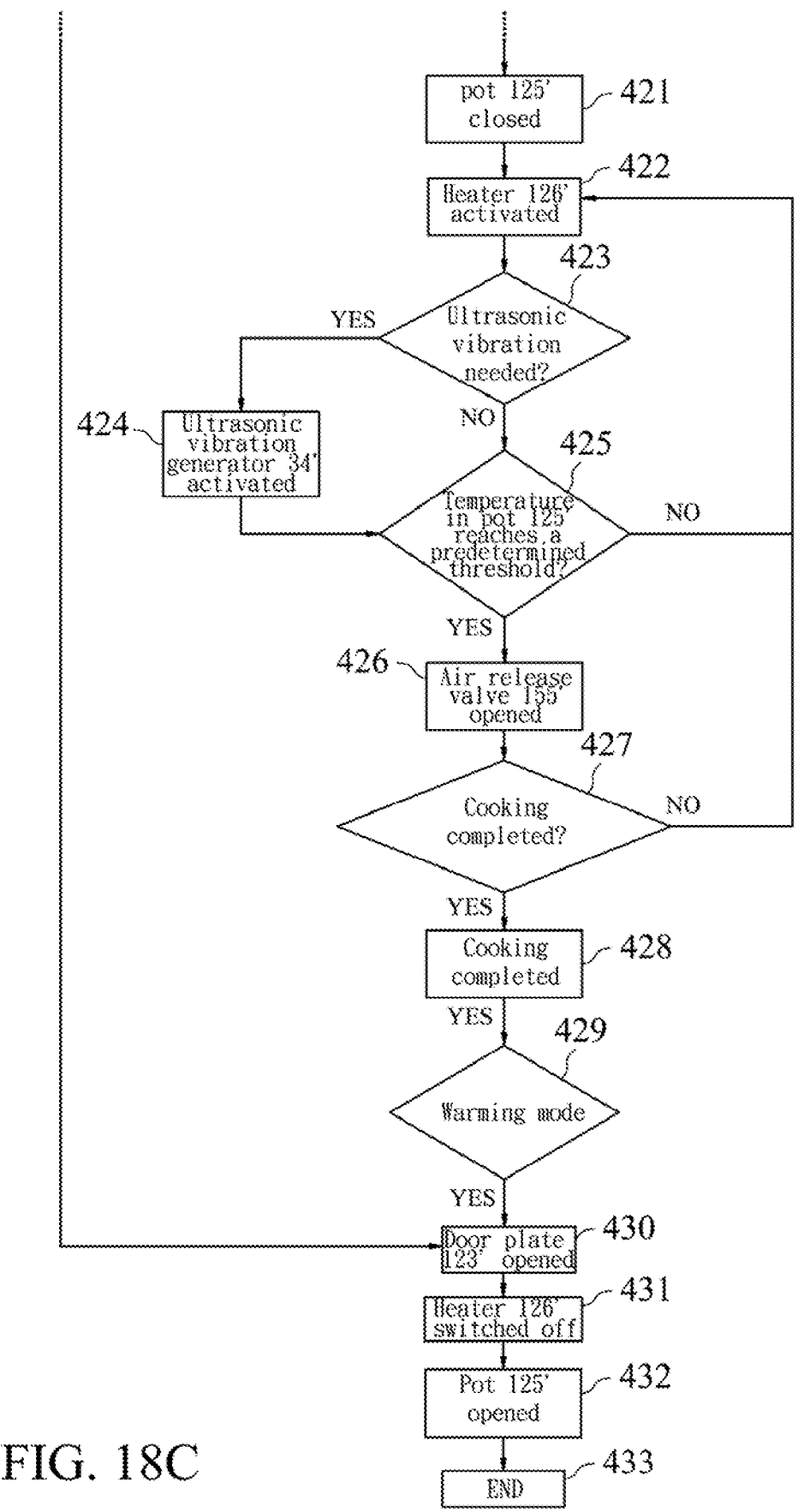

Referring to FIG. 18A to FIG. 18C of the drawings, an operation of the automatic cooking apparatus is schematically represented by a flow chart. Before cooking, preparation steps for the user is to place a washed empty or a pre-contained food pot 125' (depended on it operated on cooking or warming mode) on the heater 126' after opening the door plate 123', and fill the drinking water tank 104' and the food storage 110' with a predetermined amount of water and food items. Then, a user may enter an instruction on the control panel 132' (step 402) to select a cooking function or a warming function. The instruction may be entered through the control panel 132' (step 402) or the remote control unit 134' (step 403).

If the warming function is selected in step 404, step 440 is performed for using a pot sensor 127' to determine whether the pot 125' is already in position. When the result of step 440 is yes, step 441 is performed for using the door sensor 124' to determine whether the door plate 123' is already closed. When the result of step 441 is yes, step 442 is performed for switching the heater 126' to a warming mode, and the heater 126' is turned on for keeping the food items warm in the pot 125' (step 443). In step 444, the central processing module 133' determines whether or not the temperature in the pot 125' reaches a certain threshold as sensed by the temperature sensor 35' which is provided on a bottom side of the pot 125'. If no, step 443 keeps operating and the heater 126' is still on. If the temperature reaches the predetermined threshold, and the user wishes to retrieve the food items inside the pot 125', the door plate 123' is opened for allowing a user to retrieve the food items (step 430), and the heater 126' is switched off for a safety reason (step 431) The pot 125' is also opened (step 432) and the entire operation ends or stops (step 433). When either result of step 440 and step 441 is no, a warning signal is indicated on the control panel 132' (step 445).

If the cooking function is selected in step 404, step 405 is performed for using the pot sensor 127' to determine whether the pot 125' is properly positioned. When the result of step 405 is yes, step 406 is performed for using the door sensor 124' to determine whether the door plate 123' is properly closed. When the result of step 406 is yes, step 407 is performed for using the drinking water sensor 107' to determine whether the drinking water is adequate. When the result of step 407 is yes, step 408 is performed for using the food sensor 111' to determine whether the food items in the food storage tank 110' is adequate. When the result of step 408 is yes, the food valve 115' is opened for delivering a predetermined amount of food items (step 409) by the food valve 115'.

In step 410, if direct cooking is selected, the food items will be delivered to the pot 125' through the first food output member 114'. If grinding of food items is selected, step 411 is performed in which the food items are delivered to the grinding arrangement 32' through the second food output member 31'. The grinded food items are then delivered to the pot 125' (step 412). In step 413, if direct cooking of the grinded food items is selected, the grinded food items are delivered to the pot 125' through the third food output member 33'. If the answer is no in step 413, the drinking water valve 105' is opened (step 414) and a predetermined amount of drinking water is also delivered to the pot 125' for mixing with the food items (step 415).

Step 415 and step 410 merge with step 416. In step 416, the pot sensor 127' determines whether or not a correct amount of drinking water and food items are stored in the pot 125'. When the result of step 416 is yes, the food valve 115' and the grinding arrangement 32' are turned off (step 417), and the drinking water valve 105' is opened for delivering the drinking water (step 418) to the pot 125'. Thereafter, step 419 is performed for using the pot sensor 127' to determine whether the amount of the drinking water in the pot 125' is correct. When the result of step 419 is yes, the drinking water valve 105' is closed (step 420), and the pot 125' is closed (step 421) and a heating mode is activated for the heater 126' to heat up the drinking water and the food items in the pot 125' (step 422).

Step 423 determines whether or not ultrasonic vibration needs to be performed by the ultrasonic vibration generator 34'. If the answer is yes, the ultrasonic vibration generator 34' is activated (step 424). If no, the step 425 is performed to determine whether or not the pot 125' has reached a threshold temperature by the use of the temperature sensor 35'. If the temperature has reached a predetermined threshold, and the pressure of steam inside of cooking cavity reach a proper level, the step 426 is performed to activate the air release valve 155' for releasing of steam from the pot 125'. When the temperature has not reached the predetermined threshold, step 422 is performed again.

Then, step 427 is performed for using the controller 130' to determine whether or not cooking is finished properly. When the result of step 427 is yes, the cooking is ended (step 428), and the heater 126' is switched to the warming mode (step 429), and the door plate 123' is opened (step 430), and the heater 126' is turned off for safety reason (step 431). The pot 125' is opened (step 432) and the entire cooking process will end (step 433).

In the entire operation process, as long as abnormality occurs, warning and reminding will be issued to the user (step 445), thus ensuring that each step has been properly performed before entering the heating mode or the warming mode. Thus, for step 410 and step 413, if the determination is yes, step 416 is subsequently performed. In step 416, when the determination by the pot sensor 127' is no, step 409 is re-performed. In step 419, when the determination by the pot sensor 127' is no, step 418 is re-performed. In step 425 and step 427, when the determination by the controller 130' is no, step 422 is re-performed.

It is worth mentioning that a user may control and monitor the operation of the automatic cooking apparatus by inputting instructions through the control panel 132' and or the remote control unit 134'. The central processing module 133' is arranged to control and coordinate all the operations of the automatic cooking apparatus. The user may operate the automatic cooking apparatus in at least one of the water supplying mode and the cooking mode. Both modes of operation can be performed simultaneously in which drinking water is dispensed through the first water dispensing outlet 1042' and the second water dispensing outlet 1043'.

The present invention, while illustrated and described in terms of a preferred embodiment and several alternatives, is not limited to the particular description contained in this specification. Additional alternative or equivalent components could also be used to practice the present invention.

What is claimed is:

1. An automatic cooking apparatus, comprising:
a main housing having a receiving cavity;
a drinking water supply unit which comprises a drinking water tank supported in said receiving cavity, said drinking water tank having a drinking water cavity for storing a predetermined amount of water, and first water dispensing outlet, said water in said drinking water cavity being arranged to be selectively dispensed out of said drinking water cavity through said first water dispensing outlet;
a cooking apparatus, which comprises:
a food storage tank supported in said receiving cavity, said food storage tank comprising a food valve and having a food storage cavity for storing a predetermined amount of food items, and a food dispensing outlet, said food items being arranged to be dispensed out of said food storage cavity through said food dispensing outlet;
a first food output member and a second food output member both of which connected to said food valve;
a grinding arrangement supported in said main housing and is connected to said second food output member in such a manner that said food items passing through said food valve is selectively guided to enter one of said grinding arrangement and said first food output member;
a cooking unit, which comprises:
a pot provided in said receiving cavity at a position correspond to said food dispensing outlet and said first water dispensing outlet, in such a manner that said water and said food contained in said drinking water tank and said food storage tank are capable of being dispensed to said pot through said food dispensing outlet and said first water dispensing outlet; and
a heater which is provided in said receiving cavity, and is thermally communicated with said pot;
a filter arrangement which comprises a grinder outlet valve, a mixer-filtering unit, a first connecting tube connecting between said grinder outlet valve and said mixer-filtering unit, a second connecting tube connecting between said mixer-filtering unit to said pot, and a water supplying tube connecting between said drinking water valve and said mixer-filtering unit; and
a controller electrically connected to said drinking water supply unit and said cooking apparatus, and operates said automatic cooking apparatus on at least a cooking mode in which said water and said food items in said drinking water tank and said food storage tank are controllably dispensed to said pot through said first water dispensing outlet and said food dispensing outlet respectively, said pot being arranged to be heated up by said heater for cooking said food items and said water in said pot.

2. The automatic cooking apparatus, as recited in claim 1, wherein said grinder outlet valve is arranged to selectively allow grinded food items to selectively pass through one of said first connecting tube and said second connecting tube, said drinking water valve being arranged to allow said drinking water to selectively remain in said drinking water output tube, or to pass through said water supplying tube.

3. An automatic cooking apparatus, comprising:
- a main housing having a receiving cavity, and comprising a first housing unit and a second housing unit, said first housing unit having a first top wall, a first outer sidewall, a first inner sidewall, a first bottom wall, a first front wall and a first rear wall connected together to form a first accommodating compartment within said first top wall, said first outer sidewall, said first inner sidewall, said first bottom wall, said first front wall and said first rear wall, said second housing unit having a second top wall, a second outer sidewall, a second inner sidewall, a second bottom wall, a second front wall and a second rear wall connected together to form a second accommodating compartment within said second top wall, said second outer sidewall, said second inner sidewall, said second bottom wall, said second front wall and said second rear wall, said second housing unit further comprising a partition provided in said second accommodating compartment to define a cooking cavity in said second accommodating compartment;
- a drinking water supply unit which comprises a drinking water tank supported in said first accommodating compartment of said receiving cavity, said drinking water tank having a drinking water cavity for storing a predetermined amount of water, and first water dispensing outlet, said water in said drinking water cavity being arranged to be selectively dispensed out of said drinking water cavity through said first water dispensing outlet;
- a cooking apparatus which is accommodated in said second accommodating compartment of said second housing unit, and comprises:
- a food storage tank supported in said receiving cavity, said food storage tank comprising a food valve and having a food storage cavity for storing a predetermined amount of food items, and a food dispensing outlet, said food items being arranged to be dispensed out of said food storage cavity through said food dispensing outlet;
- a first food output member and a second food output member both of which connected to said food valve;
- a grinding arrangement supported in said main housing and is connected to said second food output member in such a manner that said food items passing through said food valve is selectively guided to enter one of said grinding arrangement and said first food output member; and
- a cooking unit, which comprises:
- a pot provided in said receiving cavity at a position correspond to said food dispensing outlet and said first water dispensing outlet, in such a manner that said water and said food contained in said drinking water tank and said food storage tank are capable of being dispensed to said pot through said food dispensing outlet and said first water dispensing outlet; and
- a heater which is provided in said receiving cavity, and is thermally communicated with said pot; and
- a controller electrically which is connected to said drinking water supply unit and said cooking apparatus, and operates said automatic cooking apparatus on at least a cooking mode in which said water and said food items in said drinking water tank and said food storage tank are controllably dispensed to said pot through said first water dispensing outlet and said food dispensing outlet respectively, said pot being arranged to be heated up by said heater for cooking said food items and said water in said pot,
wherein said second housing unit further comprises a door plate operatively provided on said second front wall at a bottom portion of said second housing unit for selectively closing said cooking cavity, and a resilient member mounted to said partition in such a manner that when said door plate is closed, said resilient member is arranged to exert a downward biasing force so as to push said resilient member to bias against said opening of said pot, said second housing unit further comprising a door sensor supported in said cooking cavity for sensing a position of said door plate.

* * * * *